(12) United States Patent
Sasaki

(10) Patent No.: US 6,671,133 B1
(45) Date of Patent: Dec. 30, 2003

(54) THIN-FILM MAGNETIC HEAD AND METHOD OF MANUFACTURING SAME

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/438,535

(22) Filed: Nov. 12, 1999

(30) Foreign Application Priority Data

Nov. 19, 1998 (JP) .......................................... 10-329892

(51) Int. Cl.[7] .................................................. G11B 5/39
(52) U.S. Cl. ........................................ 360/317; 360/322
(58) Field of Search ................................ 360/126, 317, 360/319, 322

(56) References Cited

U.S. PATENT DOCUMENTS

| 5,907,459 A | | 5/1999 | Shouji et al. | |
| 6,031,691 A | * | 2/2000 | Onuma et al. | 360/320 |
| 6,154,347 A | * | 11/2000 | Sasaki | 360/317 |
| 6,156,375 A | * | 12/2000 | Hu et al. | 427/116 |

FOREIGN PATENT DOCUMENTS

| JP | A-9-312006 | 12/1997 |
| JP | A-10-3617 | 1/1998 |

* cited by examiner

Primary Examiner—David L. Ometz
(74) Attorney, Agent, or Firm—Oliff & Berridge PLC

(57) ABSTRACT

It is an object of a thin-film magnetic head and a method of manufacturing the same of the invention to improve the insulating property between an electrode connected to a magnetoresistive element and a shield layer without increasing the thickness of an insulating layer between the magnetoresistive element and the shield layer. In the thin-film magnetic head, a bottom shield layer is formed into the shape of a frame having space in which conductive layers making up the electrode connected to an MR element are placed. The conductive layers are placed in the space (groove) of the bottom shield layer and insulated from the bottom shield layer while an insulating film is placed between the bottom shield layer and the conductive layers. The MR element is connected to the conductive layers through electrode layers.

3 Claims, 19 Drawing Sheets

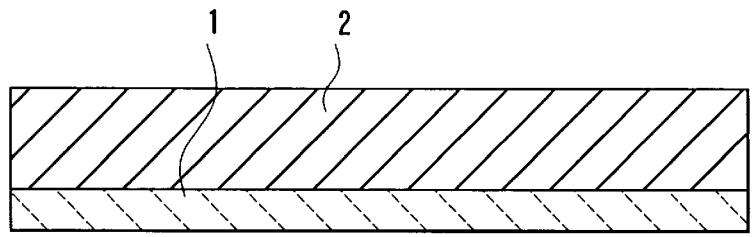
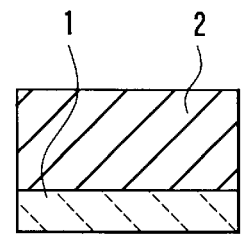
FIG. 1A  FIG. 1B
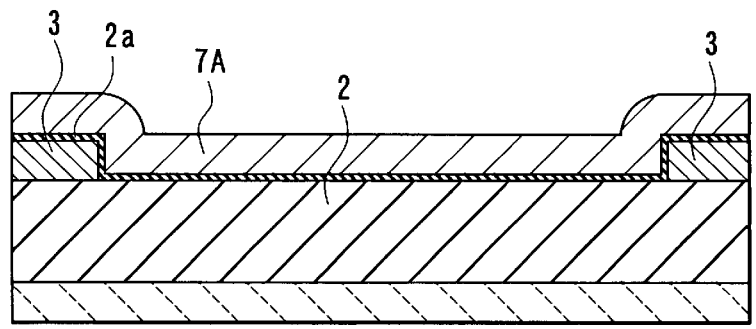
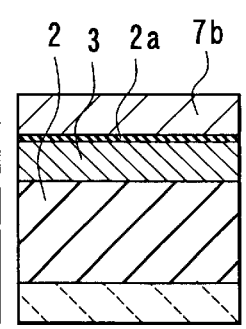
FIG. 2A  FIG. 2B
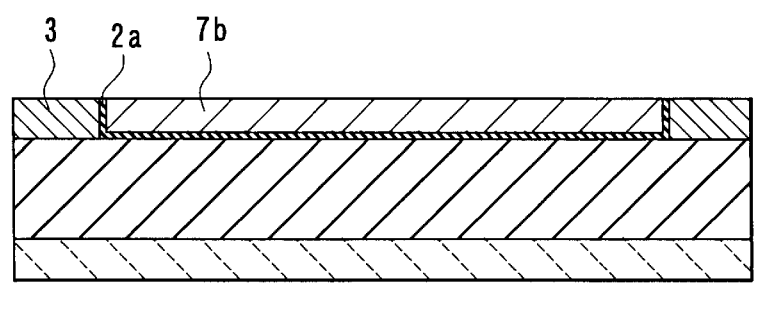
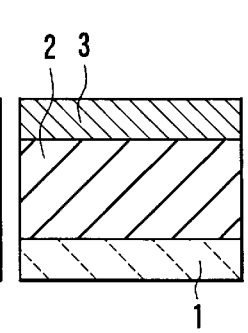
FIG. 3A  FIG. 3B

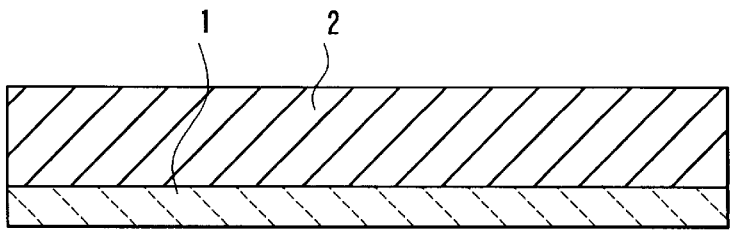 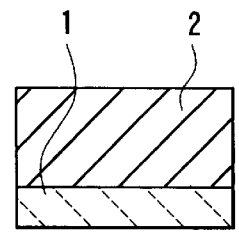
FIG. 12A  FIG. 12B
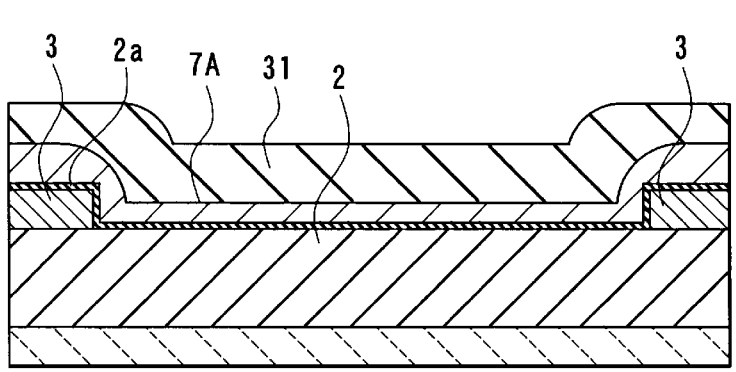 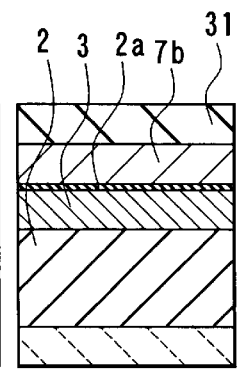
FIG. 13A  FIG. 13B
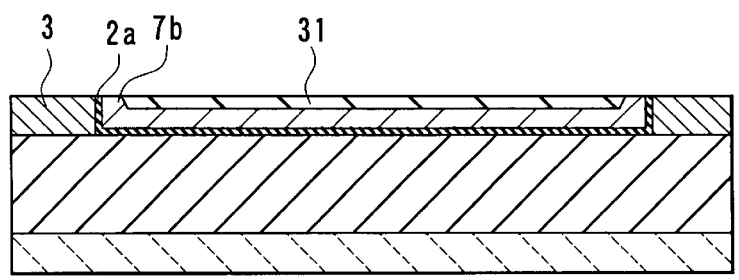 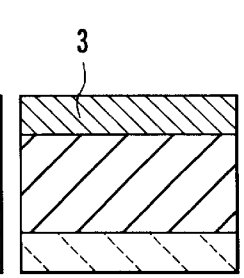
FIG. 14A  FIG. 14B

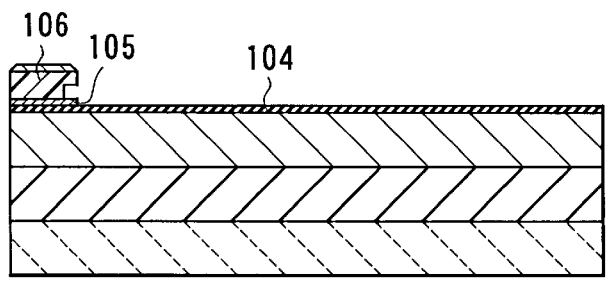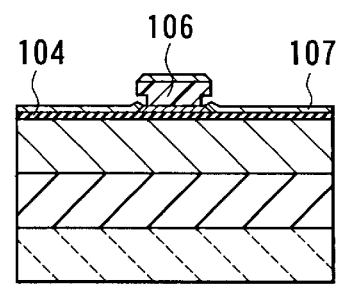
FIG. 26A
RELATED ART
FIG. 26B
RELATED ART
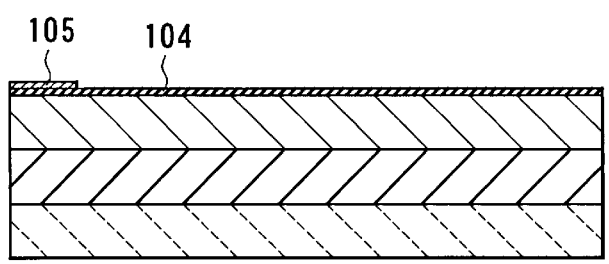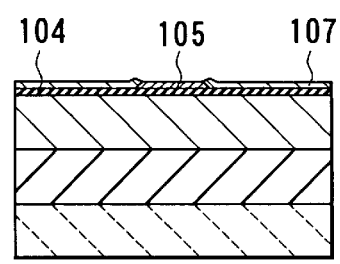
FIG. 27A
RELATED ART
FIG. 27B
RELATED ART

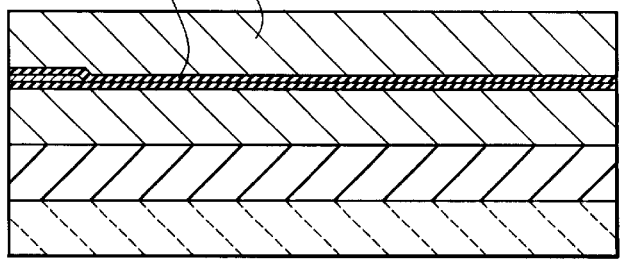 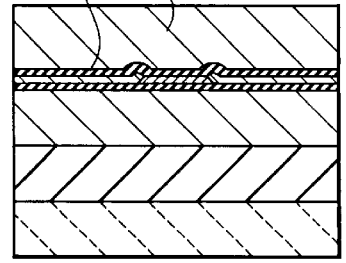
FIG. 28A
RELATED ART
FIG. 28B
RELATED ART
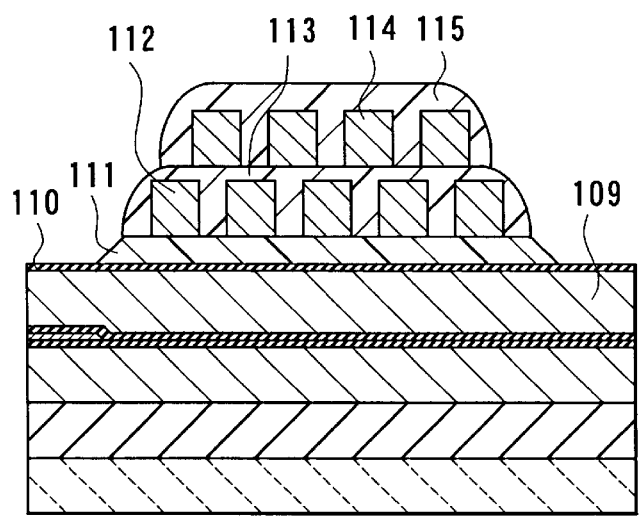 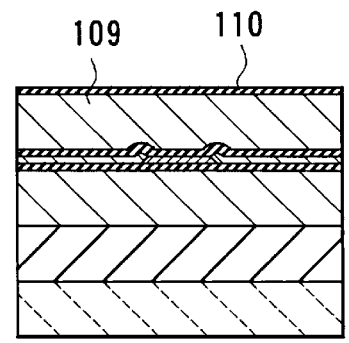
FIG. 29A
RELATED ART
FIG. 29B
RELATED ART

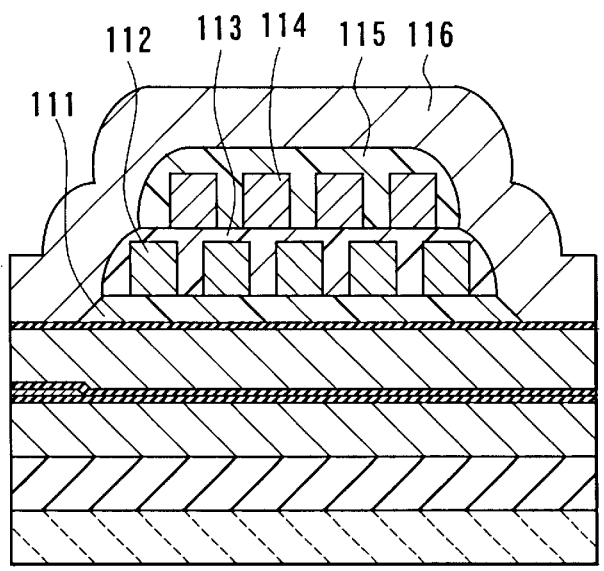 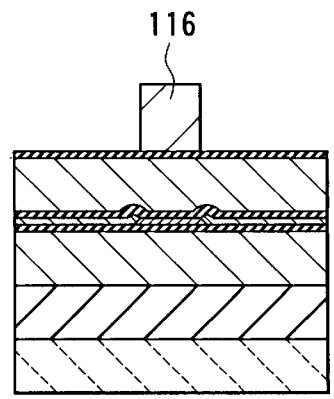
FIG. 30A
RELATED ART
FIG. 30B
RELATED ART
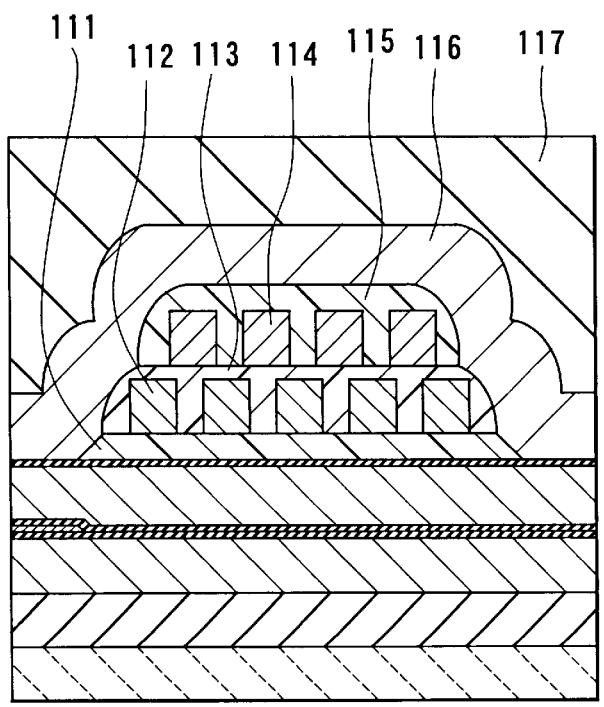 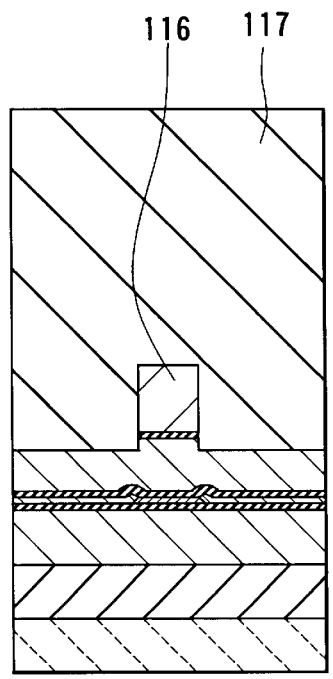
FIG. 31A
RELATED ART
FIG. 31B
RELATED ART

THIN-FILM MAGNETIC HEAD AND METHOD OF MANUFACTURING SAME

BACKGROUND OF THE INVENTION

1. Field of the Invention

The present invention relates to a thin-film magnetic head having at least a magnetoresistive element for reading and a method of manufacturing such a thin-film magnetic head.

2. Description of the Related Art

Performance improvements in thin-film magnetic heads have been sought with an increase in surface recording density of a hard disk drive. A composite thin-film magnetic head has been widely used, which is made of a layered structure including a recording head having an induction magnetic transducer for writing and a reproducing head having a magnetoresistive (MR) element for reading. MR elements include an anisotropic magnetoresistive (AMR) element that utilizes the AMR effect and a giant magnetoresistive (GMR) element that utilizes the GMR effect. A reproducing head using an AMR element is called an AMR head or simply an MR head. A reproducing head using a GMR element is called a GMR head. An AMR head is used as a reproducing head whose surface recording density is more than 1 gigabit per square inch. A GMR head is used as a reproducing head whose surface recording density is more than 3 gigabits per square inch.

Methods for improving the performance of a reproducing head include replacing an AMR film with a GMR film and the like made of a material or a configuration having an excellent magnetoresistive sensitivity, or optimizing the MR height of the MR film. The MR height is the length (height) between the air-bearing-surface-side end of an MR element and the other end. The MR height is controlled by an amount of lapping when the air bearing surface is processed. The air bearing surface is the surface of a thin-film magnetic head that faces a magnetic recording medium and may be called a track surface as well.

Many of reproducing heads have a structure in which the MR element is electrically and magnetically shielded by a magnetic material.

Reference is now made to FIG. 24A to FIG. 31A, FIG. 24B to FIG. 31B, FIG. 32 and FIG. 33 to describe an example of a manufacturing method of a composite thin-film magnetic head as an example of a related-art manufacturing method of a thin-film magnetic head. FIG. 24A to FIG. 31A are cross sections each orthogonal to the air bearing surface of the head. FIG. 24B to FIG. 31B are cross sections each parallel to the air bearing surface of the pole portion of the head.

According to the manufacturing method, as shown in FIGS. 24A and 24B, an insulating layer 102 made of alumina ($Al_2O_3$), for example, of about 5 to 10 $\mu$m in thickness is deposited on a substrate 101 made of aluminum oxide and titanium carbide ($Al_2O_3$—TiC), for example. On the insulating layer 102 a bottom shield layer 103 made of a magnetic material and having a thickness of 2 to 3 $\mu$m is formed for a reproducing head.

Next, as shown in FIGS. 25A and 25B, on the bottom shield layer 103, alumina or aluminum nitride, for example, is deposited to a thickness of 50 to 100 nm through sputtering to form a bottom shield gap film 104 as an insulating layer. On the bottom shield gap film 104, an MR film having a thickness of tens of nanometers is formed for making an MR element 105 for reproduction. Next, on the MR film a photoresist pattern 106 is selectively formed where the MR element 105 is to be formed. The photoresist pattern 106 is formed into a shape that easily allows lift-off, such as a shape having a T-shaped cross section. Next, with the photoresist pattern 106 as a mask, the MR film is etched through ion milling, for example, to form the MR element 105. The MR element 105 may be either a GMR element or an AMR element.

Next, as shown in FIGS. 26A and 26B, on the bottom shield gap film 104, a pair of first electrode layers 107 whose thickness is tens of nanometers are formed, using the photoresist pattern 106 as a mask. The first electrode layers 107 are electrically connected to the MR element 105. The first electrode layers 107 may be formed through stacking TiW, CoPt, TiW, and Ta, for example. Next, as shown in FIGS. 27A and 27B, the photoresist pattern 106 is lifted off. Although not shown in FIGS. 27A and 27B, a pair of second electrode layers whose thickness is 50 to 100 nm are formed into a specific pattern. The second electrode layers are electrically connected to the first electrode layers 107. The second electrode layers may be made of copper (Cu), for example. The first electrode layers 107 and the second electrode layers make up an electrode (that may be called a lead as well) electrically connected to the MR element 105.

Next, as shown in FIG. 28A and FIG. 28B, a top shield gap film 108 having a thickness of 50 to 150 nm is formed as an insulating layer on the bottom shield gap film 104 and the MR element 105. The MR element 105 is embedded in the shield gap films 104 and 108. Next, on the top shield gap film 108, a top shield layer-cum-bottom pole (called a top shield layer in the following description) 109 having a thickness of about 3 $\mu$m is formed. The top shield layer 109 is made of a magnetic material and used for both a reproducing head and a recording head.

Next, as shown in FIG. 29A and FIG. 29B, on the top shield layer 109, a recording gap layer 110 made of an insulating film such as an alumina film whose thickness is 0.2 to 0.3 $\mu$m is formed. On the recording gap layer 110, a photoresist layer 111 for determining the throat height is formed into a specific pattern whose thickness is about 1.0 to 2.0 $\mu$m. Next, on the photoresist layer 111, a thin-film coil 112 of a first layer is made for the induction-type recording head. The thickness of the thin-film coil 112 is 3 $\mu$m. Next, a photoresist layer 113 is formed into a specific pattern on the photoresist layer 111 and the coil 112. On the photoresist layer 113, a thin-film coil 114 of a second layer is then formed into a thickness of 3 $\mu$m. Next, a photoresist layer 115 is formed into a specific pattern on the photoresist layer 113 and the coil 114.

Next, as shown in FIG. 30A and FIG. 30B, the recording gap layer 110 is partially etched in a portion behind the coils 112 and 114 (the right side of FIG. 30A) to form a magnetic path. A top pole 116 having a thickness of about 3 $\mu$m is then formed for the recording head on the recording gap layer 110 and the photoresist layers 111, 113 and 115. The top pole 116 is made of a magnetic material such as Permalloy (NiFe) or FeN as a high saturation flux density material. The top pole 116 is in contact with the top shield layer (bottom pole) 109 and is magnetically coupled to the top shield layer 109 in a portion behind the coils 112 and 114.

As shown in FIG. 31A and FIG. 31B, the recording gap layer 110 and the top shield layer (bottom pole) 109 are etched through ion milling, using the top pole 116 as a mask. Next, an overcoat layer 117 of alumina, for example, having a thickness of 20 to 30 $\mu$m is formed to cover the top pole 116. Finally, machine processing of the slider is performed to form the air bearing surfaces of the recording head and the reproducing head. The thin-film magnetic head is thus completed. As shown in FIG. 31A and FIG. 31B, the structure is called a trim structure wherein the sidewalls of the top pole 116, the recording gap layer 110, and part of the top shield layer (bottom pole) 109 are formed vertically in a self-aligned manner. The trim structure suppresses an increase in the effective track width due to expansion of the magnetic flux generated during writing in a narrow track.

FIG. 32 is a top view wherein the MR element 105, the first electrode layers 107 and the second electrode layers 118 are formed on the bottom shield gap film 104. FIG. 33 is a top view of the thin-film magnetic head manufactured as described above. The overcoat layer 117 is omitted in FIG. 33. FIG. 24A to FIG. 31A are cross sections taken along line 31A—31A of FIG. 33. FIG. 24B to FIG. 31B are cross sections taken along line 31B—31B of FIG. 33.

As shown in FIG. 32 and FIG. 33, the related-art thin-film magnetic head has the structure wherein the electrode layers 107 and 118 connected to the MR element 105 are inserted in a wide region between the bottom shield layer 103 and the top shield layer 109 for shielding the MR element 105. The very thin bottom shield gap film 104 and top shield gap film 108 are each placed between the shield layer 103 and the electrode layers 107 and 118 and between the shield layer 109 and the electrode layers 107 and 118, respectively. High insulation property is therefore required for the shield gap films 104 and 108. The yield of the thin-film magnetic heads thus greatly depends on the insulation property.

With improvements in performance of the recording head, a problem of thermal asperity comes up. Thermal asperity is a reduction in reproducing characteristic due to self-heating of the reproducing head during reproduction. To overcome thermal asperity, a material with high cooling efficiency is required for the bottom shield layer 103 and the shield gap films 104 and 108 in the related art. Therefore, the bottom shield layer 103 is made of a magnetic material such as Permalloy or Sendust in the related art. The shield gap films 104 and 108 are made of a material such as alumina, through sputtering, into a thickness of 100 to 150 nm, for example. The shield gap films 104 and 108 thus magnetically and electrically isolate the shield layers 103 and 109 from the MR element 105 and the electrode layers 107 and 118.

It is inevitable that thermal asperity should be overcome in order to improve the performance of the reproducing head. Recently, the thickness of the shield gap films 104 and 108 has been reduced to as thin as 50 to 100 nm, for example. The cooling efficiency of the MR element 105 is thereby improved so as to overcome thermal asperity.

However, since the shield gap films 104 and 108 are formed through sputtering, faults may result in the magnetic and electrical insulation that isolates the shield layers 103 and 109 from the MR element 105 and the electrode layers 107 and 118, due to particles or pinholes in the films. Such faults more often result if the shield gap films 104 and 108 are thinner.

In order to improve the output characteristic of the reproducing head, it is preferred that the wiring resistance of the electrode connected to the MR element is as low as possible so that a minute change in the output signal corresponding to a minute change in resistance of the MR element can be detected. Therefore, the areas of the electrode layers 118 are often designed to be large in the related art. However, the areas of the portions of the electrode layers 118 that face the shield gap films 104 and 108 are increased, as a result. If the shield gap films 104 and 108 are thin as described above, magnetic and electrical insulation faults may more often result between the electrode layers 118 and each of the shield layers 103 and 109.

As described above, it is preferred that the wiring resistance of the electrode connected to the MR element is low to improve the output characteristic of the reproducing head. However, there is a limit to reducing the wiring resistance of the electrode since the electrode is made up of the electrode layers 107 and 118 as thin as 50 to 100 nm inserted between the shield layers 103 and 109 in the related-art thin-film magnetic head.

Since a narrow track width is required for the thin-magnetic head, a minute-size MR element is required. For a GMR head, in particular, it is required to precisely detect the output signal of the minute MR element. It is therefore required to reduce noises caused by internal factors such as the coils of the induction-type recording head or external factors such as the motor of the hard disk drive. However, the electrode layers 118 carry noises in the related-art thin-film magnetic head. Such noises may reduce the performance of the reproducing head.

In Japanese Patent Application Laid-open Hei 9-312006 (1997) a technique is disclosed for reducing the electric resistance of the lead and preventing insulation faults between the lead and the top shield. The length of the bottom shield is made shorter than the top shield in the direction of drawing out the lead connected to the MR element from between the top and bottom shields. The thickness of the portion of the lead between the top and bottom shields is made thin. The portion of the lead off the bottom shield is made thick and made to protrude downward.

In the technique, however, the lead is hardly shielded by the bottom shield. As a result, magnetic flux from the coil is easily received in the GMR head that requires a high output. The lead therefore tends to carry noises.

A technique disclosed in Japanese Patent Application Laid-open Hei 10-3617 (1998) is that a conductor connected to an MR element is embedded in a groove formed in an insulating layer between the MR element and a shield layer so as to reduce the shield gap.

However, this technique will not improve the insulation property between the lead and the shield layer.

OBJECTS AND SUMMARY OF THE INVENTION

It is a first object of the invention to provide a thin-film magnetic head and a method of manufacturing the same for improving the insulation property between the shield layer and the electrode connected to the magnetoresistive element without increasing the thickness of the insulating layer between the shield layer and the magnetoresistive element.

It is a second object of the invention to provide a thin-film magnetic head and a method of manufacturing the same for reducing the wiring resistance of the electrode connected to the magnetoresistive element.

It is a third object of the invention to provide a thin-film magnetic head and a method of manufacturing the same for reducing the effect of noises on the magnetoresistive element.

A thin-film magnetic head of the invention comprises: a magnetoresistive element; two shield layers, placed to face each other with the magnetoresistive element in between, for shielding the magnetoresistive element; insulating layers each of which is provided between the magnetoresistive element and each of the shield layers; and an electrode connected to the magnetoresistive element. One of the shield layers has the shape of a frame having a space in which at least part of the electrode is placed. The at least part of the electrode is placed in the space and insulated from the one of the shield layers.

According to the thin-film magnetic head of the invention, the two shield layers are placed to face each other with the magnetoresistive element in between. One of the shield layers has the shape of a frame having the space in which at least part of the electrode is placed. The at least part of the electrode is placed in the space of the one of the shield layers while the at least part of the electrode is insulated from the one of the shield layers.

In the head, an insulating film may be provided between the one of the shield layers and the electrode, and the one of the shield layers may be insulated from the electrode by the insulating film.

The head may further comprise an induction-type magnetic transducer for writing. The transducer includes: two magnetic layers magnetically coupled to each other and including magnetic pole portions opposed to each other, the pole portions being located in regions on a side of a surface facing a recording medium, the magnetic layers each including at least one layer; a gap layer placed between the pole portions of the magnetic layers; and a thin-film coil at least part of which is placed between the magnetic layers, the at least part of the coil being insulated from the magnetic layers.

A method of the invention is provided for manufacturing a thin-film magnetic head comprising: a magnetoresistive element; a first shield layer and a second shield layer, placed to face each other with the magnetoresistive element in between, for shielding the magnetoresistive element; a first insulating layer provided between the magnetoresistive element and the first shield layer and a second insulating layer provided between the magnetoresistive element and the second shield layer; and an electrode connected to the magnetoresistive element. The method includes the steps of: forming the first shield layer; forming the first insulating layer on the first shield layer; forming the magnetoresistive element on the first insulating layer; forming the second insulating layer on the magnetoresistive element and the first insulating layer; and forming the second shield layer on the second insulating layer. In the step of forming the first shield layer or the step of forming the second shield layer, one of the first and second shield layers is formed into the shape of a frame having a space in which at least part of the electrode is placed. The method further includes the step of forming the electrode such that the at least part of the electrode is placed in the space and insulated from the one of the shield layers.

According to the method of the invention, the two shield layers are placed to face each other with the magnetoresistive element in between. One of the shield layers is formed into the shape of the frame having the space in which at least part of the electrode is placed. The at least part of the electrode is placed in the space of the one of the shield layers while the at least part of the electrode is insulated from the one of the shield layers.

The method may further include the step of forming an insulating film between the one of the shield layers and the electrode, so that the one of the shield layers is insulated from the electrode by the insulating film.

According to the method, in the step of forming the electrode, an electrode layer to be the at least part of the electrode may be formed in the space of the one of the shield layers and on the one of the shield layers while the insulating film is placed between the electrode layer and the one of the shield layers, and the electrode layer may be flattened so that the one of the shield layers is exposed to form the at least part of the electrode.

The method may further include the step of forming an induction-type magnetic transducer for writing. The transducer includes: two magnetic layers magnetically coupled to each other and including magnetic pole portions opposed to each other, the pole portions being located in regions on a side of a surface facing a recording medium, the magnetic layers each including at least one layer; a gap layer placed between the pole portions of the magnetic layers; and a thin-film coil at least part of which is placed between the magnetic layers, the at least part of the coil being insulated from the magnetic layers.

Other and further objects, features and advantages of the invention will appear more fully from the following description.

BRIEF DESCRIPTION OF THE DRAWINGS

FIG. 1A and FIG. 1B are cross sections for illustrating a step in a method of manufacturing a thin-film magnetic head of a first embodiment of the invention.

FIG. 2A and FIG. 2B are cross sections for illustrating a step that follows FIG. 1A and FIG. 1B.

FIG. 3A and FIG. 3B are cross sections for illustrating a step that follows FIG. 2A and FIG. 2B.

FIG. 12A and FIG. 12B are cross sections for illustrating a step in a method of manufacturing a thin-film magnetic head of a second embodiment of the invention.

FIG. 13A and FIG. 13B are cross sections for illustrating a step that follows FIG. 12A and FIG. 12B.

FIG. 14A and FIG. 14B are cross sections for illustrating a step that follows FIG. 13A and FIG. 13B.

FIG. 26A and FIG. 26B are cross sections for illustrating a step that follows FIG. 25A and FIG. 25B.

FIG. 27A and FIG. 27B are cross sections for illustrating a step that follows FIG. 26A and FIG. 26B.

FIG. 28A and FIG. 28B are cross sections for illustrating a step that follows FIG. 27A and FIG. 27B.

FIG. 29A and FIG. 29B are cross sections for illustrating a step that follows FIG. 28A and FIG. 28B.

FIG. 30A and FIG. 30B are cross sections for illustrating a step that follows FIG. 29A and FIG. 29B.

FIG. 31A and FIG. 31B are cross sections for illustrating a step that follows FIG. 30A and FIG. 30B.

DETAILED DESCRIPTION OF THE PREFERRED EMBODIMENTS

First Embodiment

Figures 4A, 4B:
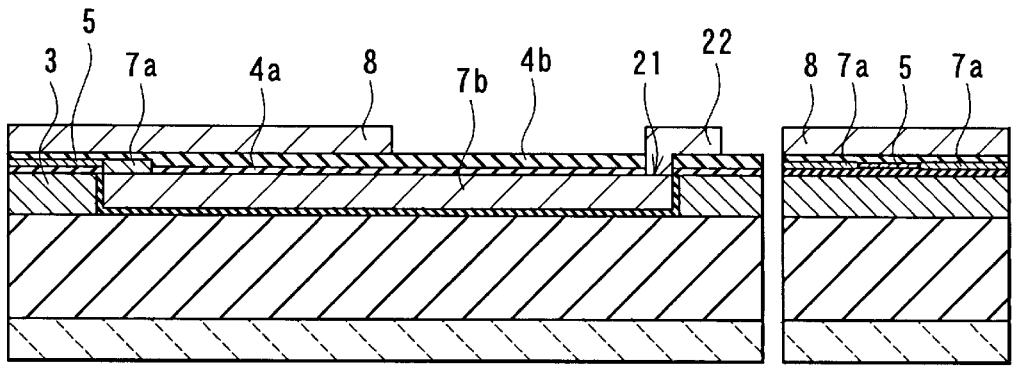
FIG. 4A and FIG. 4B are cross sections for illustrating a step that follows FIG. 3A and FIG. 3B.

Preferred embodiments of the invention will now be described in detail with reference to the accompanying drawings. Reference is now made to FIG. 1A to FIG. 9A, FIG. 1B to FIG. 9B, FIG. 10 and FIG. 11 to describe a method of manufacturing a composite thin-film magnetic head as a method of manufacturing a thin-film magnetic head of a first embodiment of the invention. FIG. 1A to FIG. 9A are cross sections each orthogonal to the air bearing surface of the thin-film magnetic head. FIG. 1B to FIG. 9B are cross sections each parallel to the air bearing surface of the pole portion of the head.

In the method of the embodiment, as shown in FIG. 1A and FIG. 1B, an insulating layer 2 made of alumina ($Al_2O_3$), for example, of about 5 μm in thickness is deposited on a substrate 1 made of aluminum oxide and titanium carbide ($Al_2O_3$—TiC), for example.

Next, although not shown, a seed layer as an electrode film is formed on the insulating layer 2 through sputtering. The seed layer is to be used for forming a bottom shield layer through a frame plating method.

Next, as shown in FIG. 2A and FIG. 2B, on the seed layer, a magnetic material such as Permalloy (NiFe) is deposited to a thickness of about 2 to 3 μm through frame plating with a photoresist film as a mask to form a bottom shield layer 3 for a reproducing head. Next, part of the seed layer where the bottom shield layer 3 is not formed is selectively removed. In this embodiment, the bottom shield layer 3 is formed into a shape of a frame having spaces in which conductive layers making up part of an electrode described later are placed, which will be described in detail below.

Next, on the bottom shield layer 3 and the insulating layer 2, an insulating film 2a of alumina, for example, whose thickness is 0.3 to 0.8 μm is formed. Next, a pair of electrode layers 7A made of copper (Cu), for example, and having a thickness of about 3 to 4 μm are formed on the insulating film 2a. The electrode layers 7A are to be part of the electrode (lead) connected to the MR element. The electrode layers 7A may be formed through plating, sputtering, or chemical vapor deposition (CVD).

Next, as shown in FIG. 3A and FIG. 3B, the electrode layers 7A are polished through mechanical polishing or chemical mechanical polishing (CMP) to the surface of the bottom shield layer 3 and flattened. Next, unwanted portions of the frame pattern for the bottom shield layer 3 and unwanted portions of the electrode layers 7A are selectively removed through etching. The electrode layers 7A are thereby formed into conductive layers 7b that make up part of the electrode connected to the MR element. A structure is thus obtained wherein the conductive layers 7b are placed in a self-aligned manner in the spaces formed inside the frame-shaped bottom shield layer 3, the insulating film 2a being placed between the conductive layers 7b and the bottom shield layer 3.

As thus described, the conductive layers 7b are formed to be precisely embedded in a self-aligned manner in the spaces of the bottom shield layer 3 fully covered with the insulating film 2a whose thickness is 0.3 to 0.8 μm. As a result, an extremely high insulation property is obtained between the conductive layers 7b and the bottom shield layer 3. It is therefore possible to prevent magnetic and electrical insulation faults between the conductive layers 7b and the bottom shield layer 3 due to particles or pinholes in the film.

Next, as shown in FIG. 4A and FIG. 4B, an insulating material such as aluminum nitride or alumina is sputtered to a thickness of about 40 to 100 nm over the bottom shield layer 3 and the conductive layers 7b. A bottom shield gap film 4a as an insulating layer is thus formed. Before forming the bottom shield gap film 4a, a photoresist pattern in a T-shape, for example, is formed to facilitate liftoff where contact holes are to be formed for electrically connecting the conductive layers 7b to electrode layers described later. After the bottom shield gap film 4a is formed, the contact holes are formed through lifting off the photoresist pattern. Alternatively, the contact holes may be formed by selectively etching the bottom shield gap film 4a through the use of photolithography. Similarly, contact holes 21 are formed in the bottom gap film 4a for connecting the conductive layer 7b to other conductive layers provided for connection to pads formed in the slider.

Next, an MR film of tens of nanometers in thickness for forming the MR element 5 for reproduction is deposited through sputtering on the bottom shield gap film 4a. A photoresist pattern (not shown) is then selectively formed where the MR element 5 is to be formed on the MR film. The photoresist pattern is T-shaped, for example, to facilitate liftoff. Next, the MR film is etched through argon-base ion milling, for example, with the photoresist pattern as a mask to form the MR element 5. The MR element 5 may be either a GMR element or an AMR element.

Next, on the bottom shield gap film 4a, a pair of electrode layers 7a having a thickness of 80 to 150 nm are formed through sputtering with the same photoresist pattern as a mask. The electrode layers 7a are to be electrically connected to the MR element 5. The electrode layers 7a may be formed through stacking TiW, CoPt, TiW, Ta, and Au, for example. The electrode layers 7a are electrically connected to the conductive layers 7b through the contact holes provided in the bottom shield gap film 4a. The electrode layers 7a and the conductive layers 7b make up the electrode connected to the MR element 5.

Next, on the bottom shield gap film 4a, the MR element 5 and the electrode layers 7a, an insulating material such as aluminum nitride or alumina is sputtered to a thickness of about 50 to 100 nm to form a top shield gap film 4b as an insulating layer. The MR element 5 is thus embedded in the shield gap films 4a and 4b.

Next, a top shield layer-cum-bottom pole layer (called a top shield layer in the following description) 8 made of a magnetic material is formed on the top shield gap film 4b. The top shield layer 8 is used for both reproducing and recording heads. The top shield layer 8 may be made of NiFe or a high saturation flux density material such as FeN or a compound thereof or an amorphous of Fe—Co—Zr. The top shield layer 8 may be made of layers of NiFe and a high saturation flux density material. Conductive layers 22 connected to the conductive layers 7b are formed in the contact holes 21 at the same time as the top shield layer 8 is formed, through the use of a material the same as that of the top shield layer 8.

Figures 5A, 5B:
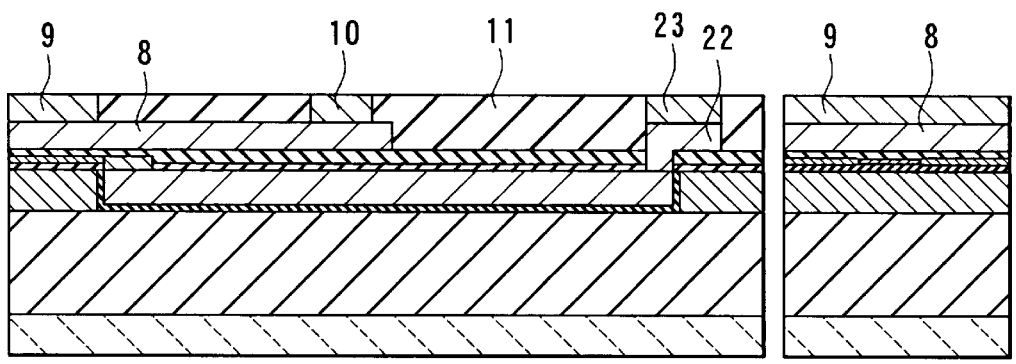
FIG. 5A and FIG. 5B are cross sections for illustrating a step that follows FIG. 4A and FIG. 4B.

Next, as shown in FIG. 5A and FIG. 5B, a bottom pole tip 9 is formed on the top shield layer 8. A magnetic layer 10 for making a magnetic path is formed on a portion of the top shield layer 8 where the top and bottom magnetic layers are connected to each other. Conductive layers 23 are formed on the conductive layers 22. The bottom pole tip 9, the magnetic layer 10 and the conductive layers 23 are made of NiFe or a high saturation flux density material as mentioned above and each have a thickness of 1.5 to 2.5 $\mu$m.

Next, an insulating layer 11 made of an alumina film or a silicon dioxide film having a thickness of 6 to 8 $\mu$m is formed over the entire surface. The entire surface is then flattened so that the surfaces of the bottom pole tip 9, the magnetic layer 10 and the conductive layers 23 are exposed. The flattening may be performed through mechanical polishing or CMP. Such a flattening process prevents formation of a rise in the bottom pole tip 9 caused by the pattern of the MR element 5. The surface of the bottom pole tip 9 is thus made flat, and the recording gap layer of the magnetic pole portion of the recording head to be formed is made flat. As a result, the writing property in a high frequency range is improved.

Figures 6A, 6B:
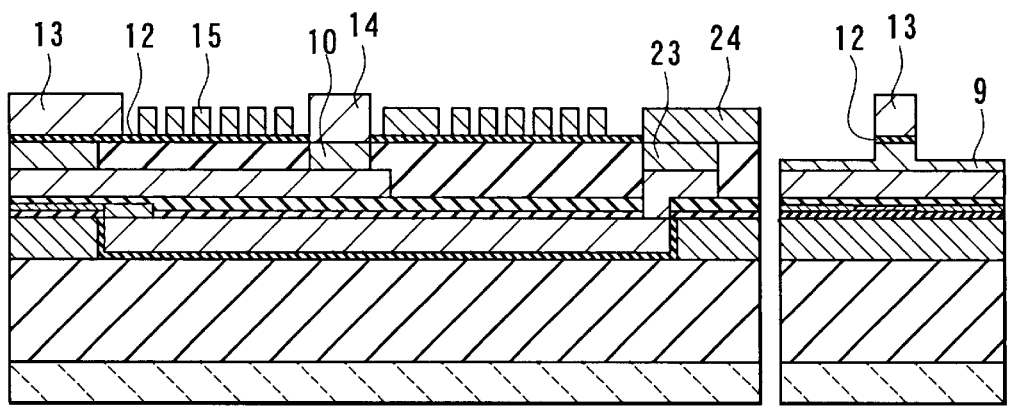
FIG. 6A and FIG. 6B are cross sections for illustrating a step that follows FIG. 5A and FIG. 5B.

Next, as shown in FIG. 6A and FIG. 6B, a recording gap layer 12 made of an insulating film of alumina, for example, and having a thickness of 0.2 to 0.3 $\mu$m is formed on the flattened surface. Portions of the recording gap layer 12 on the magnetic layer 10 and the conductive layers 23 are then etched to form contact holes.

Next, a top pole tip 13 made of a magnetic material and having a thickness of 2 to 3 $\mu$m, for example, is formed on the recording gap layer 12 in the pole portion. The top pole tip 13 is provided for the recording head and defines the track width of the recording head. On the magnetic layer 10, a magnetic layer 14 made of a material the same as that of the top pole tip 13 and having a thickness of 2 to 3 $\mu$m, for example, is formed for making the magnetic path. The top pole tip 13 may be formed through plating with NiFe (80 weight % Ni and 20 weight % Fe) or a high saturation flux density material such as NiFe (50 weight % Ni and 50 weight % Fe), or through sputtering a high saturation flux density material such as FeN or a compound thereof and then patterning. Besides the above examples, the material of the top pole tip 13 may be a high saturation flux density material such as an amorphous of Fe—Co—Zr. Alternatively, the top pole tip 13 may be layers of two or more of the above materials. The top pole tip 13 made of a high saturation flux density material allows the magnetic flux generated by coils to effectively reach the pole portion without saturating before reaching the pole. A recording head that achieves high recording density is therefore obtained.

Next, part of the recording gap layer 12 in the pole portion on both sides of the top pole tip 13 is removed through dry etching. The bottom pole tip 9 thus exposed is then etched through ion milling by about 0.3 to 0.5 $\mu$m, for example, with the top pole tip 13 as a mask so as to form a trim structure.

Next, on the recording gap layer 12, a thin-film coil 15 of a first layer for the recording head is formed through plating, for example, whose thickness is 1.5 to 2.5 $\mu$m. At the same time, conductive layers 24 are formed on the conductive layers 23.

Figures 7A, 7B:
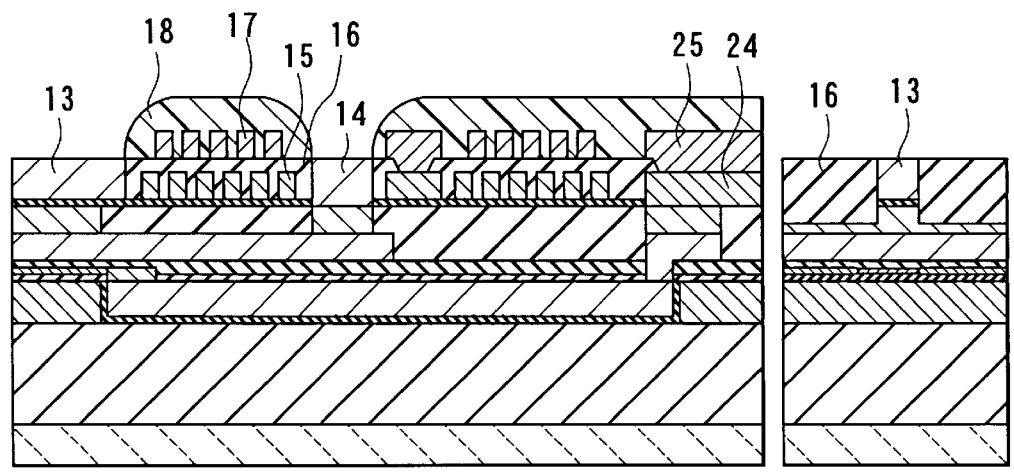
FIG. 7A and FIG. 7B are cross sections for illustrating a step that follows FIG. 6A and FIG. 6B.

Next, as shown in FIG. 7A and FIG. 7B, an insulating layer 16 of alumina or silicon dioxide having a thickness of 3 to 4 $\mu$m is formed over the entire surface. The entire surface is then flattened so that the surfaces of the top pole tip 13 and the magnetic layer 14 are exposed. This flattening may be performed through mechanical polishing or CMP. Next, contact holes are formed in a portion of the insulating layer 16 where the thin-film coil 15 of the first layer and a thin-film coil of a second layer described later are connected to each other and in portions of the insulating layer 16 above the conductive layers 24.

Next, a thin-film coil 17 of a second layer whose thickness is 1.5 to 2.5 $\mu$m is formed through plating, for example, on the insulating layer 16. At the same time, conductive layers 25 are formed on the conductive layers 24. Next, an insulating layer 18 made of photoresist is formed into a specific pattern on the insulating layer 16 and the coil 17. Next, the entire structure is cured at a temperature of about 250° C., for example.

Figures 8A, 8B:
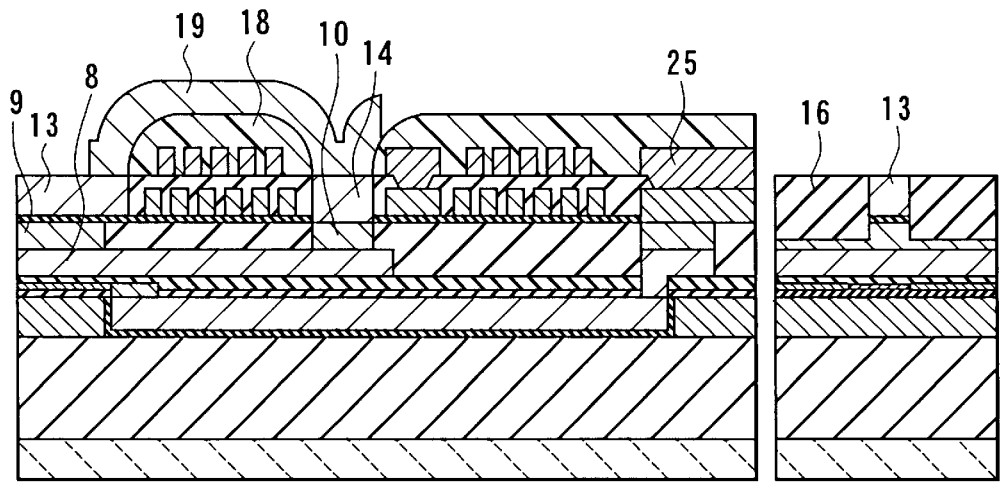
FIG. 8A and FIG. 8B are cross sections for illustrating a step that follows FIG. 7A and FIG. 7B.
Figures 9A, 9B:
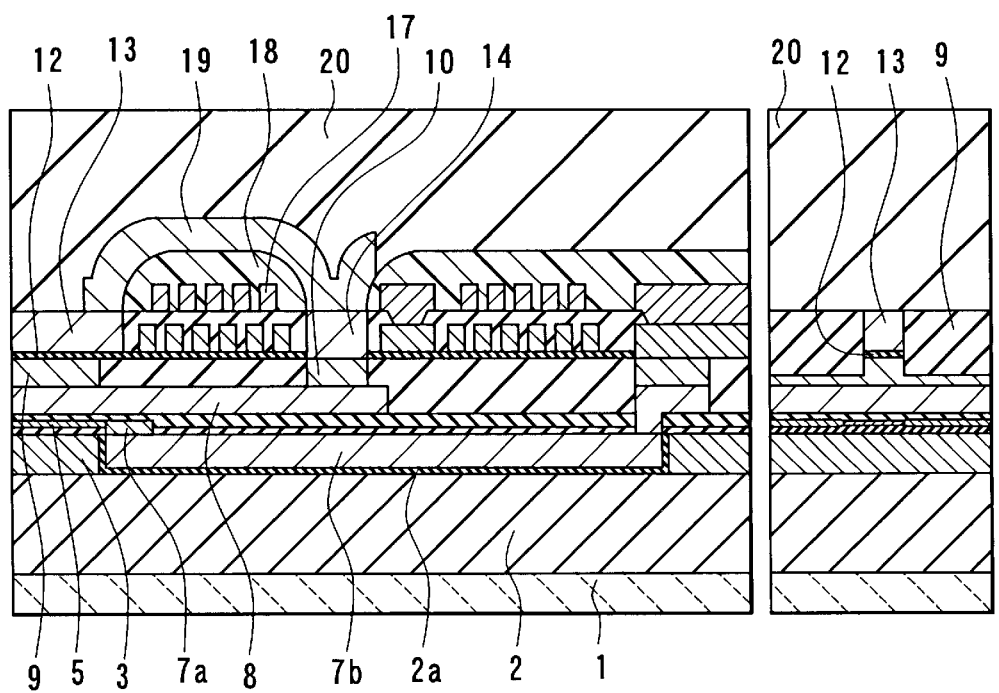
FIG. 9A and FIG. 9B are cross sections for illustrating a step that follows FIG. 8A and FIG. 8B.

Next, as shown in FIG. 8A and FIG. 8B, a top pole layer 19 made of a magnetic material and having a thickness of about 3 to 4 $\mu$m is formed for the recording head on the region from the top pole tip 13 through the insulating layer 18 to the magnetic layer 14. The top pole layer 19 is in contact with and magnetically coupled to the top shield layer 8, the magnetic layers 14 and 10 being placed between the top pole layer 19 and the top shield layer 8. Next, an overcoat layer 20 of alumina, for example, is formed to cover the top pole layer 19. Finally, machine processing of the slider is performed and the air bearing surfaces of the recording head and the reproducing head are formed. The thin-film magnetic head is thus completed.

The top shield layer (bottom pole layer) 8, the bottom pole tip 9, the recording gap layer 12, the top pole tip 13, the top pole layer 19, the magnetic layers 10 and 14, and the thin-film coils 15 and 17 correspond to an induction-type magnetic transducer of the invention.

Figure 10:
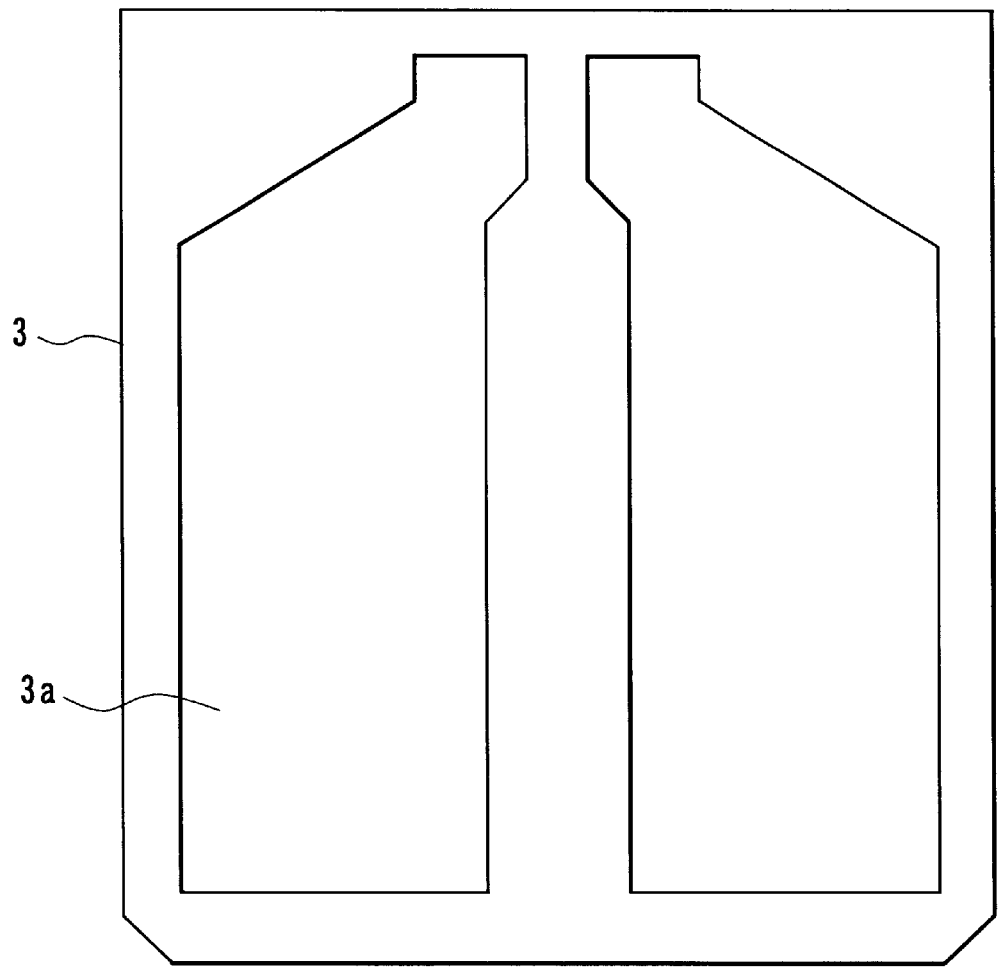
FIG. 10 is a top view of a bottom shield layer of the first embodiment.
Figure 11:
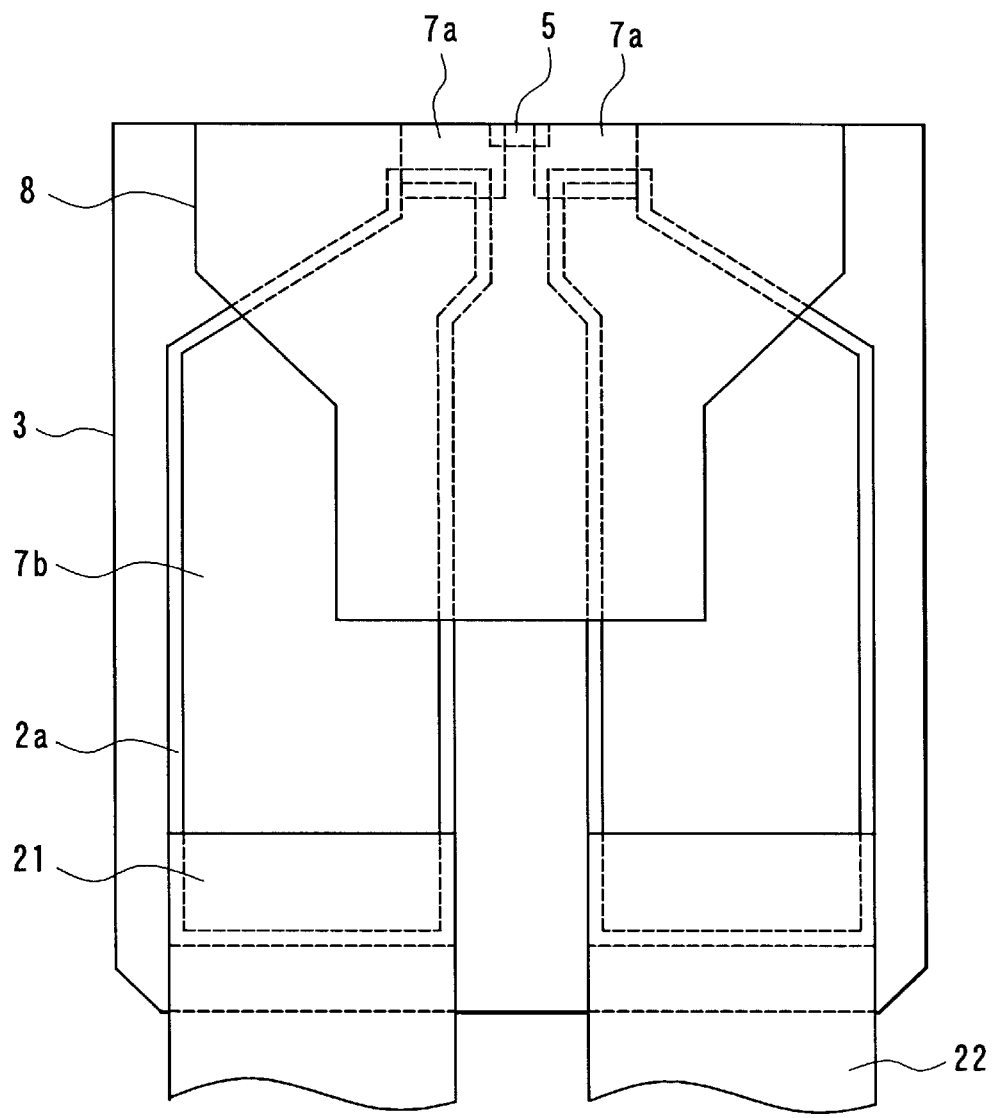
FIG. 11 is a top view of FIG. 4A and FIG. 4B.

FIG. 10 is a top view of the bottom shield layer 3. FIG. 11 is a top view of FIG. 4A and FIG. 4B. As shown, the bottom shield layer 3 has the form of a frame having the spaces 3a inside in which the conductive layers 7b are placed. The conductive layers 7b are placed in the spaces formed inside the bottom shield layer 3 while the insulating film 2a is placed between the conductive layers 7b and the bottom shield layer 3.

According to the embodiment thus described, the conductive layers 7b forming part of the electrode (lead) connected to the MR element 5 are placed in the spaces formed inside the bottom shield layer 3, the insulating film 2a being placed between the conductive layers 7b and the bottom shield layer 3. As a result, an extremely high insulation property is achieved between the conductive layers 7b and the bottom shield layer 3. It is therefore possible to prevent magnetic and electrical insulation faults between the conductive layers 7b and the bottom shield layer 3.

Part of the conductive layers 7b faces the top shield layer 8 with the bottom shield gap film 4a and the top shield gap film 4b in between. However, the most part of the conductive layers 7b does not face the top shield layer 8. As a result, the insulation property is extremely high between the conductive layers 7b and the top shield layer 8, too. It is therefore possible to prevent magnetic and electrical insulation faults between the conductive layers 7b and the top shield layer 8.

According to the embodiment, the conductive layers 7b are not inserted between the bottom shield gap film 4a and the top shield gap film 4b. As a result, it is impossible that large areas of the conductive layers 7b face the bottom shield layer 3 and the top shield layer 8 with the bottom shield gap film 4a and the top shield gap film 4b in between. Therefore, although the bottom shield gap film 4a and the top shield gap film 4b are made thin, the insulation property is maintained at a high level between the conductive layers 7b and the bottom shield layer 3 and between the conductive layers 7b and the top shield layer 8.

According to the embodiment described so far, the insulation property is improved between the electrode connected to the MR element 5 and the bottom shield layer 3 and between the electrode and the top shield layer 8 without increasing the thickness of the bottom shield gap film 4a and the top shield gap film 4b.

According to the embodiment, the bottom shield gap film 4a and the top shield gap film 4b are made thin enough to improve the thermal asperity. The property of the reproducing head is thereby improved.

According to the embodiment, the conductive layers 7b are made thick enough so that the wiring resistance of the electrode connected to the MR element 5 is made lower. As a result, it is possible to detect with sensitivity a minute change in the output signal corresponding to a minute change in resistance of the MR element 5. The property of the reproducing head is improved in this respect, too.

In the embodiment, lateral surfaces of part of the conductive layers 7b placed in the spaces 3a of the bottom shield layer 3 are shielded by the bottom shield layer 3, being placed in the middle of the bottom shield layer 3 along the direction of length. As a result, it is possible to reduce the effects of noises caused by internal factors such as magnetism generated by the coil of the induction-type recording head or external factors such as the motor of the hard disk drive. In the neighborhood of the MR element 5, in particular, both sides of the conductive layers 7b are shielded by the bottom shield layer 3, and the top surfaces of the conductive layers 7b are shielded by the top shield layer 8. The effects of noises on the MR element 5 connected to the conductive layers 7b through the electrode layers 7a are thereby reduced. The property of the reproducing head is improved in this respect, too.

According to the embodiment, the top one of the magnetic layers of the recording head is divided into the top pole tip 13 and the top pole layer 19. As a result, the top pole tip 13 may be further reduced in size and it is easy to form the recording head having a narrow track width of the submicron order. In addition, the top pole layer 19 touches the top pole tip 13 at the total of four surfaces including the top surface and the three lateral surfaces of the top pole tip 13. As a result, a magnetic flux passing through the top pole layer 19 is effectively fed into the top pole tip 13 without saturating. The recording head that achieves high recording density is therefore obtained. According to the embodiment, the trim structure is obtained through etching the bottom pole tip 9 with the finely made top pole tip 13 as a mask. It is therefore possible to suppress an increase in the effective track width due to expansion of the magnetic flux generated during writing in a narrow track.

Second Embodiment

Reference is now made to FIG. 12A to FIG. 20A, FIG. 12B to FIG. 20B, FIG. 21 to FIG. 23 to describe a method of manufacturing a composite thin-film magnetic head as a method of manufacturing a thin-film magnetic head of a second embodiment of the invention. FIG. 12A to FIG. 20A are cross sections each orthogonal to the air bearing surface of the thin-film magnetic head. FIG. 12B to FIG. 20B are cross sections each parallel to the air bearing surface of the pole portion of the head.

In the method of the embodiment, as shown in FIG. 12A and FIG. 12B, the insulating layer 2 made of alumina ($Al_2O_3$), for example, of about 5 $\mu$m in thickness is deposited on the substrate 1 made of aluminum oxide and titanium carbide ($Al_2O_3$—TiC), for example.

Next, as shown in FIG. 13A and FIG. 13B, on the insulating layer 2, a magnetic material such as Permalloy (NiFe) is deposited to a thickness of about 2 to 3 $\mu$m through plating to form the bottom shield layer 3 for a reproducing head.

Next, on the bottom shield layer 3 and the insulating layer 2, the insulating film 2a of alumina, for example, whose thickness is 0.3 to 0.8 $\mu$m is formed. Next, a pair of electrode layers 7A made of copper (Cu), for example, and having a thickness of 3 to 4 $\mu$m are formed on the insulating film 2a. The electrode layers 7A are to be part of the electrode (lead) connected to the MR element. The electrode layers 7A may be formed through plating, sputtering, or CVD. Next, an insulating layer 31 made of an alumina film or a silicon dioxide film and having a thickness of 4 to 5 $\mu$m is formed on the entire surface.

Next, as shown in FIG. 14A and FIG. 14B, the entire surface is flattened so that the surface of the bottom shield layer 3 is exposed. This flattening may be performed through mechanical polishing or CMP. Through this flattening, the electrode layers 7A are formed into the conductive layers 7b. A structure is thus obtained wherein the conductive layers 7b are placed in a self-aligned manner in the spaces formed inside the frame-shaped bottom shield layer 3, the insulating film 2a being placed between the conductive layers 7b and the bottom shield layer 3. Through this flattening, the outer rims of the conductive layers 7b are exposed while the most inner portions thereof are covered with the insulating layer 31.

As thus described, the conductive layers 7b are formed to be precisely embedded in a self-aligned manner in the spaces of the bottom shield layer 3 fully covered with the insulating film 2a whose thickness is 0.3 to 0.8 $\mu$m. As a result, an extremely high insulation property is obtained between the conductive layers 7b and the bottom shield layer 3. It is therefore possible to prevent magnetic and electrical insulation faults between the conductive layers 7b and the bottom shield layer 3 due to particles or pinholes in the layers.

Figures 15A, 15B:
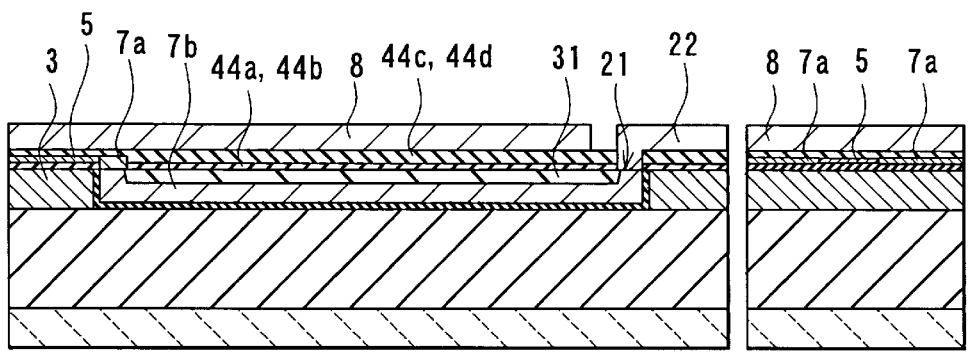
FIG. 15A and FIG. 15B are cross sections for illustrating a step that follows FIG. 14A and FIG. 14B.

Next, as shown in FIG. 15A and FIG. 15B, an insulating material such as aluminum nitride or alumina is sputtered to a thickness of about 50 to 100 nm over the bottom shield layer 3, the conductive layers 7b and the insulating layer 31. A first bottom shield gap film 44a is thus formed. While the bottom shield gap film 44a is formed, contact holes are formed for electrically connecting the conductive layers 7b to electrode layers described later, and the contact holes 21 are formed for connecting the conductive layers 7b to other conductive layers provided for connection to pads.

Next, an insulating material such as aluminum nitride or alumina is deposited to a thickness of about 0.1 to 0.3 μm on a portion of the first bottom shield gap film 44a further from the pole portion than the contact holes for connecting the electrode layers to the conductive layers 7b. A second bottom shield gap film 44b is thus formed. In the drawings, the first bottom shield gap film 44a and the second bottom shield gap film 44b are shown as a single layer for convenience.

Next, an MR film of tens of nanometers in thickness for forming the MR element 5 for reproduction is deposited through sputtering on the first bottom shield gap film 44a in the pole portion. A photoresist pattern (not shown) is then selectively formed where the MR element 5 is to be formed on the MR film. The photoresist pattern is T-shaped, for example, to facilitate liftoff. Next, the MR film is etched through argon-base ion milling, for example, with the photoresist pattern as a mask to form the MR element 5. The MR element 5 may be either a GMR element or an AMR element.

Next, on the conductive layers 7b, a pair of electrode layers 7a having a thickness of 80 to 150 nm are formed through sputtering with the same photoresist pattern as a mask. The electrode layers 7a are to be electrically connected to the MR element 5. The electrode layers 7a may be formed through stacking TiW, CoPt, TiW, Ta, and Au, for example. The electrode layers 7a are electrically connected to the conductive layers 7b through the contact holes provided in the first bottom shield gap film 44a. The electrode layers 7a and the conductive layers 7b make up the electrode connected to the MR element 5.

Next, on the electrode layers 7a and the second bottom shield gap film 44b, an insulating material such as aluminum nitride or alumina is formed through sputtering to a thickness of about 50 to 100 nm to form a first top shield gap film 44c. Next, on the MR element 5 and the first top shield gap film 44c, an insulating material such as aluminum nitride or alumina is formed through sputtering to a thickness of about 0.1 to 0.3 μm to form a second top shield gap film 44d. The MR element 5 is thus embedded in the shield gap films 44a and 44d. In the drawings, the first top shield gap film 44c and the second top shield gap film 44d are shown as a single layer for convenience.

Next, the top shield layer-cum-bottom pole layer (called the top shield layer in the following description) 8 made of a magnetic material is formed on the second top shield gap film 44d. The top shield layer 8 is used for both reproducing and recording heads. The top shield layer 8 may be made of NiFe or a high saturation flux density material such as FeN or a compound thereof or an amorphous of Fe—Co—Zr. The top shield layer 8 may be made of layers of NiFe and a high saturation flux density material. The conductive layers 22 connected to the conductive layers 7b are formed in the contact holes 21 at the same time as the top shield layer 8 is formed, through the use of a material the same as that of the top shield layer 8.

Figures 16A, 16B:
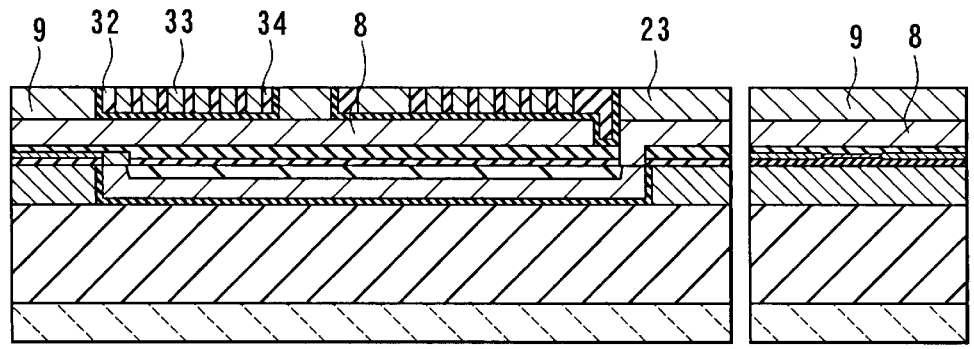
FIG. 16A and FIG. 16B are cross sections for illustrating a step that follows FIG. 15A and FIG. 15B.

Next, as shown in FIG. 16A and FIG. 16B, the bottom pole tip 9 is formed on the top shield layer 8. The magnetic layer 10 for making a magnetic path is formed on a portion of the top shield layer 8 where the top and bottom magnetic layers are connected to each other. The conductive layers 23 are formed on the conductive layers 22. The bottom pole tip 9, the magnetic layer 10 and the conductive layers 23 are made of NiFe or a high saturation flux density material as mentioned above and each have a thickness of 1.5 to 2.5 μm.

Next, an insulating film 32 made of an alumina film or a silicon dioxide film having a thickness of 0.3 to 0.5 μm is formed over the entire surface. Next, on the insulating film 32, a thin-film coil 33 of a first layer for the recording head is formed through plating, for example, whose thickness is 1 to 2 μm. Next, an insulating layer 34 made of an alumina film or a silicon dioxide film having a thickness of 4 to 6 μm is formed over the entire surface. The entire surface is then flattened so that the surfaces of the bottom pole tip 9, the magnetic layer 10 and the conductive layers 23 are exposed. This flattening may be performed through mechanical polishing or CMP. Such a flattening process prevents formation of a rise in the bottom pole tip 9 caused by the pattern of the MR element 5. The surface of the bottom pole tip 9 is thus made flat, and the recording gap layer of the magnetic pole portion of the recording head to be formed is made flat. As a result, the writing property in a high frequency range is improved.

Figures 17A, 17B:
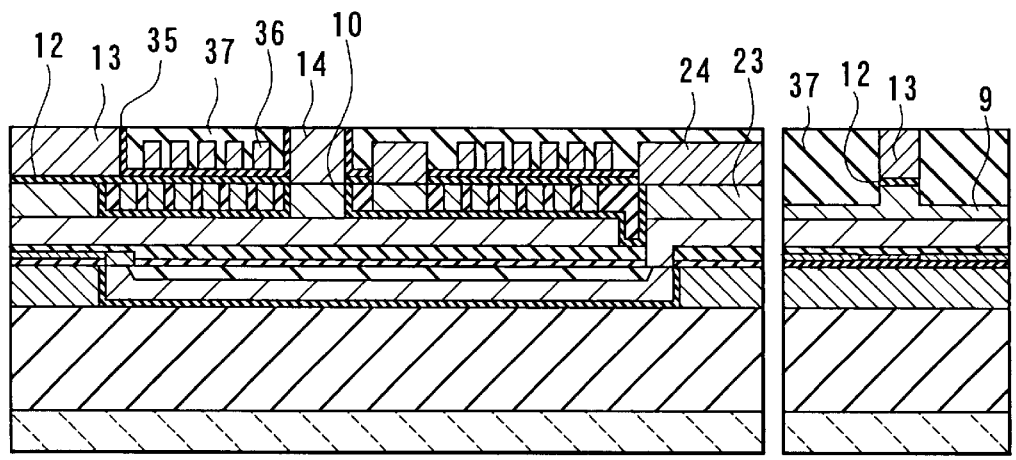
FIG. 17A and FIG. 17B are cross sections for illustrating a step that follows FIG. 16A and FIG. 16B.

Next, as shown in FIG. 17A and FIG. 17B, the recording gap layer 12 made of an insulating film of alumina, for example, and having a thickness of 0.2 to 0.3 μm is formed on the flattened surface. Next, portions of the recording gap layer 12 on the magnetic layer 10, on the conductive layers 23, and where the thin-film coil 33 of the first layer is connected to a thin-film coil of a second layer are etched through dry etching such as reactive ion etching or ion beam milling to form contact holes.

Next, the top pole tip 13 made of a magnetic material and having a thickness of 3 to 5 μm, for example, is formed on the recording gap layer 12 in the pole portion. The top pole tip 13 is provided for the recording head and defines the track width of the recording head. On the magnetic layer 10, the magnetic layer 14 made of a material the same as that of the top pole tip 13 and having a thickness of 3 to 5 μm, for example, is formed for making the magnetic path. The top pole tip 13 may be formed through plating with NiFe (80 weight % Ni and 20 weight % Fe) or a high saturation flux density material such as NiFe (50 weight % Ni and 50 weight % Fe), or through sputtering a high saturation flux density material such as FeN or a compound thereof and then patterning. Besides the above examples, the material of the top pole tip 13 may be a high saturation flux density material such as an amorphous of Fe—Co—Zr. Alternatively, the top pole tip 13 may be layers of two or more of the above materials. The top pole tip 13 made of a high saturation flux density material allows the magnetic flux generated by coils to effectively reach the pole portion without saturating before reaching the pole. A recording head that achieves high recording density is therefore obtained.

Next, part of the recording gap layer 12 in the pole portion on both sides of the top pole tip 13 is removed through dry etching. The bottom pole tip 9 thereby exposed is then etched through ion milling by about 0.4 μm, for example, with the top pole tip 13 as a mask so as to form a trim structure.

Next, an insulating film 35 of alumina or silicon dioxide having a thickness of 0.3 to 0.5 μm is formed over the entire surface. A contact hole is formed in the insulating film 35 where the thin-film coil 33 of the first layer is to be connected to the thin-film coil of the second layer. Next, the thin-film coil 36 of the second layer whose thickness is 1.5 to 2.5 μm is formed through plating, for example, on the insulating film 35. At the same time, the conductive layers 24 are formed on the conductive layers 23. Next, an insulating layer 37 of alumina or silicon dioxide having a thickness of 4 to 5 µm is formed over the entire surface. The entire surface is then flattened so that the surfaces of the top pole tip 13 and the magnetic layer 14 are exposed. This flattening may be performed through mechanical polishing or CMP. Through this flattening, the thickness of the top pole tip 13 is finally made 2 to 3 µm.

Figures 18A, 18B:
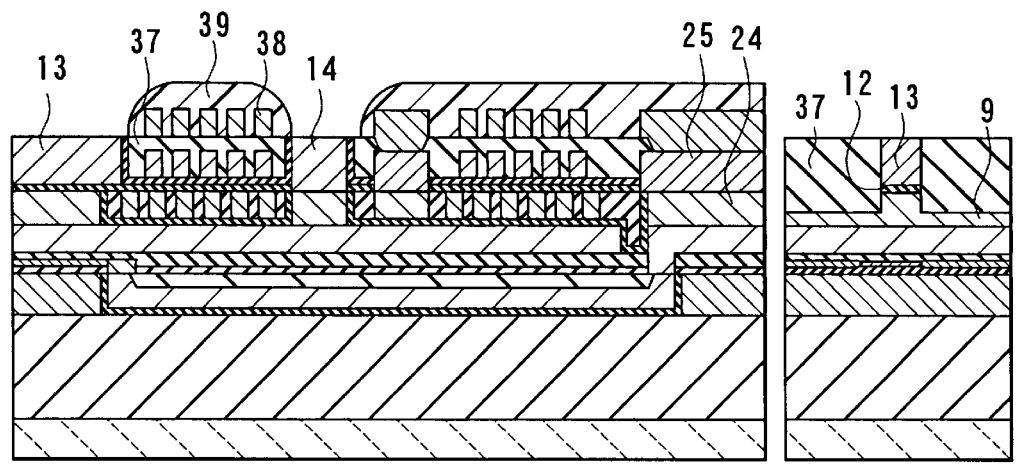
FIG. 18A and FIG. 18B are cross sections for illustrating a step that follows FIG. 17A and FIG. 17B.

Next, as shown in FIG. 18A and FIG. 18B, contact holes are formed in a portion of the insulating layer 37 where the thin-film coil 36 of the second layer and a thin-film coil of a third layer are to be connected to each other and in portions of the insulating layer 37 above the conductive layers 24. Next, the thin-film coil 38 of the third layer whose thickness is 1.5 to 2.5 µm is formed through plating, for example, on the insulating layer 37. At the same time, the conductive layers 25 are formed on the conductive layers 24. Next, an insulating layer 39 made of photoresist is formed into a specific pattern on the insulating layer 37 and the coil 38. Next, the entire structure is cured at a temperature of 250° C., for example.

Figures 19A, 19B:
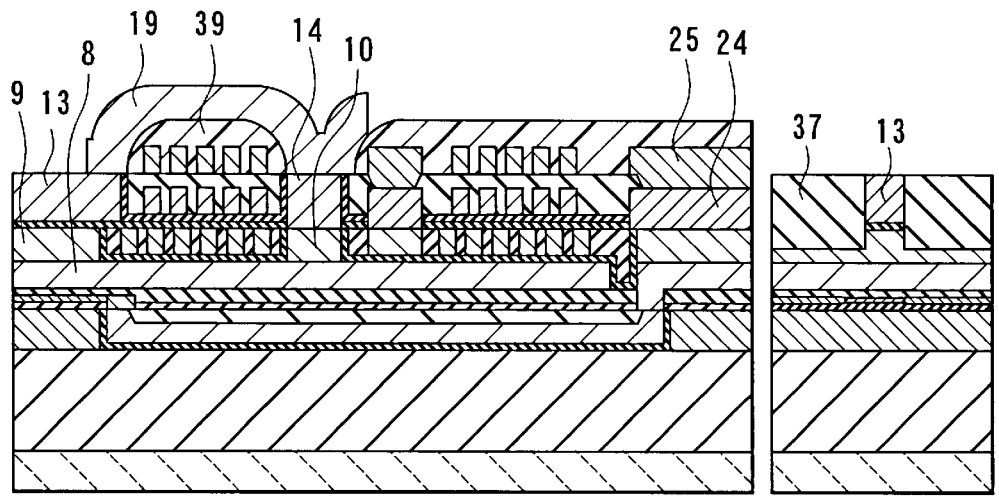
FIG. 19A and FIG. 19B are cross sections for illustrating a step that follows FIG. 18A and FIG. 18B.

Next, as shown in FIG. 19A and FIG. 19B, the top pole layer 19 made of a magnetic material and having a thickness of 2 to 3 µm is formed for the recording head on the region from the top pole tip 13 through the insulating layer 39 to the magnetic layer 14. The top pole layer 19 is in contact with and magnetically coupled to the top shield layer 8 while the magnetic layers 14 and 10 are placed between the top pole layer 19 and the top shield layer 8.

Figures 20A, 20B:
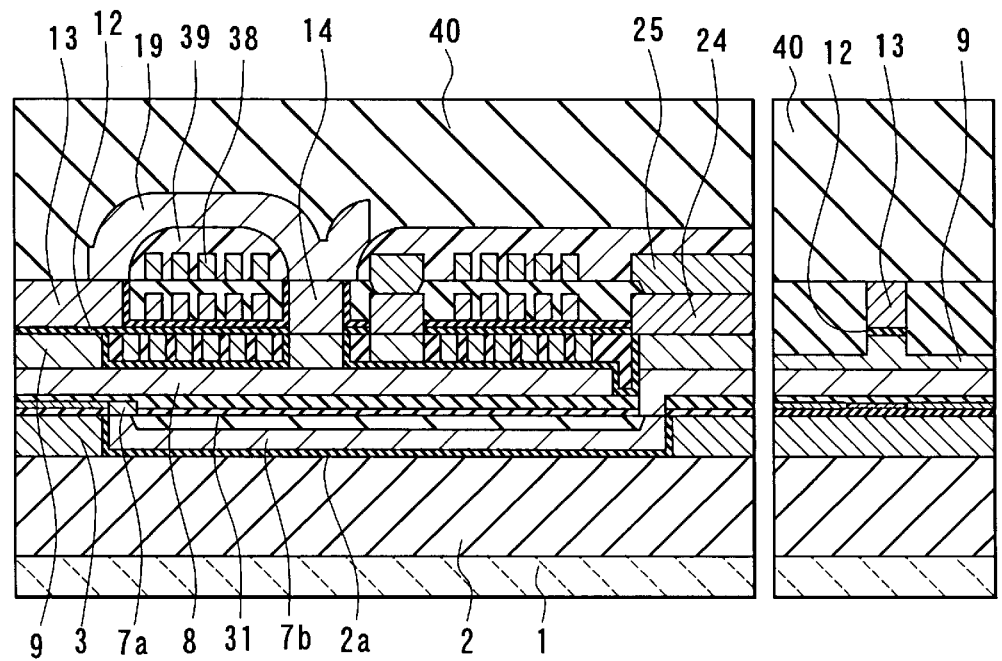
FIG. 20A and FIG. 20B are cross sections for illustrating a step that follows FIG. 19A and FIG. 19B.

Next, as shown in FIG. 20A and FIG. 20B, the overcoat layer 20 of alumina, for example, is formed to cover the top pole layer 19. Finally, machine processing of the slider is performed and the air bearing surfaces of the recording head and the reproducing head are formed. The thin-film magnetic head is thus completed.

Figure 21:
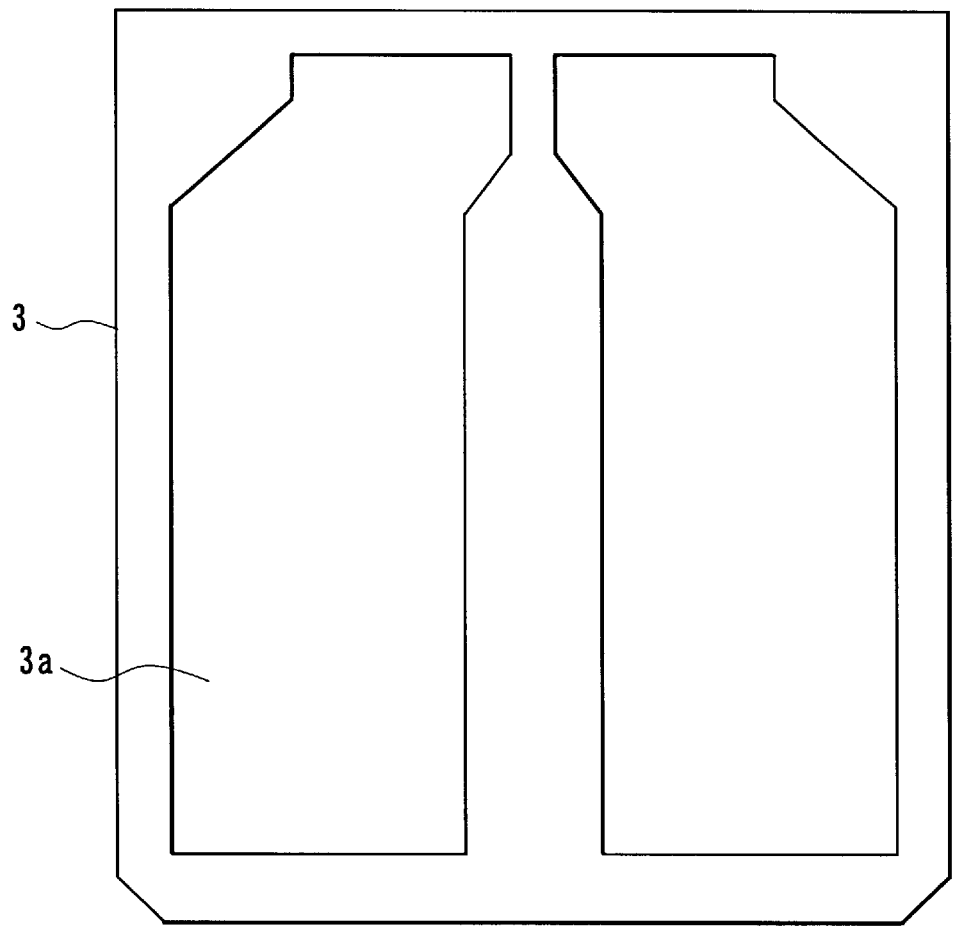
FIG. 21 is a top view of a bottom shield layer of the second embodiment.
Figure 22:
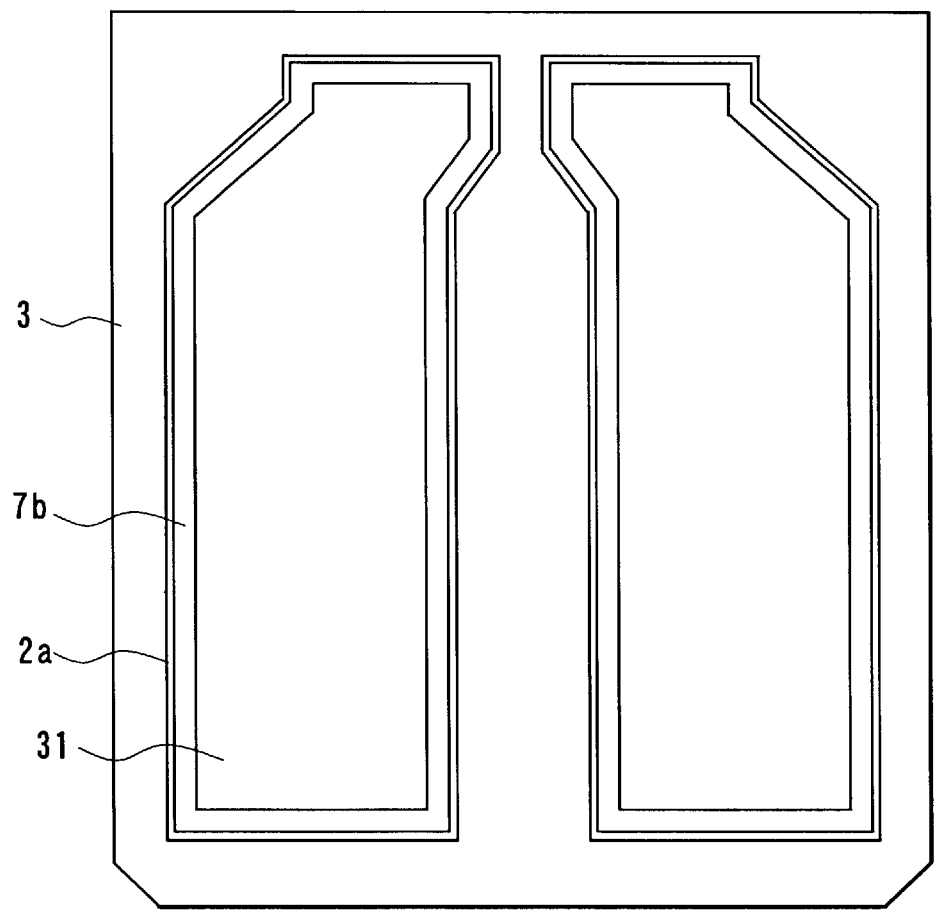
FIG. 22 is a top view of FIG. 14A and FIG. 14B.
Figure 23:
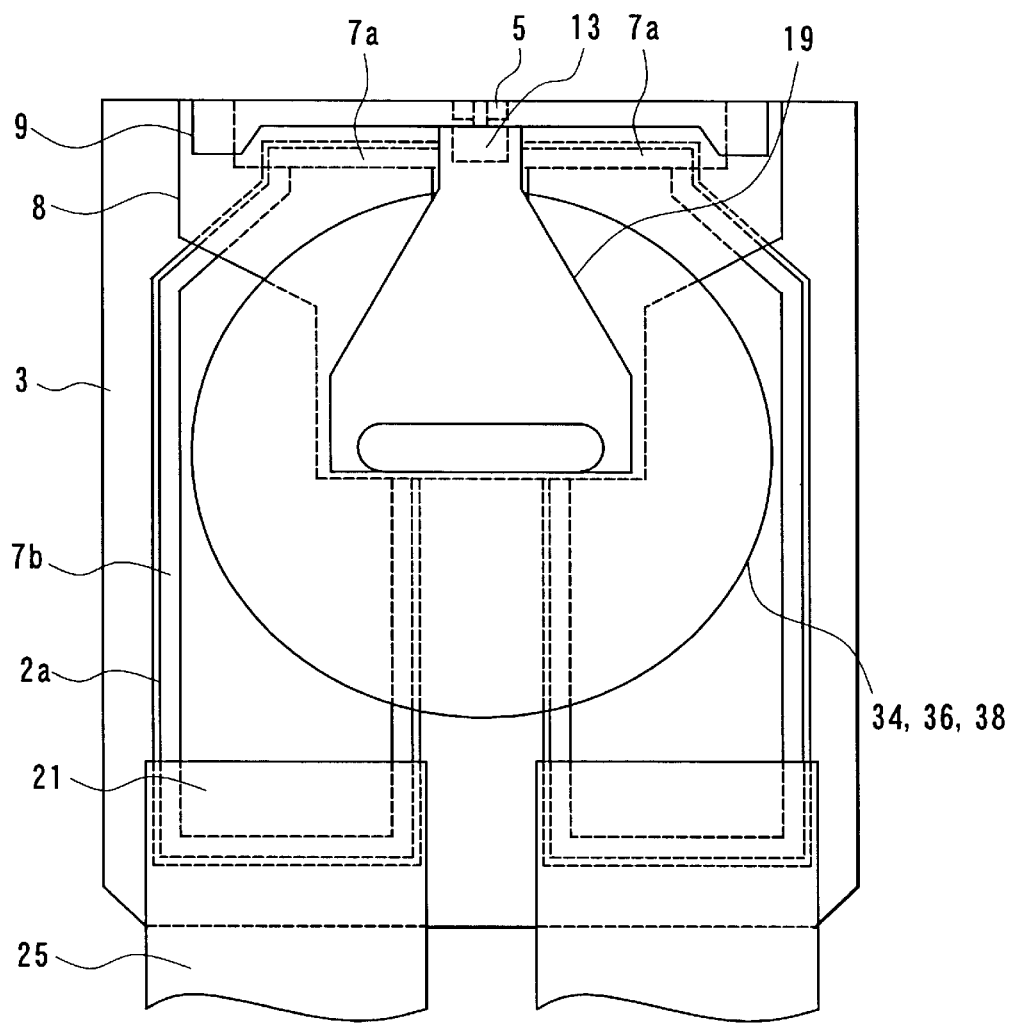
FIG. 23 is a top view of FIG. 19A and FIG. 19B.
Figure 24A:
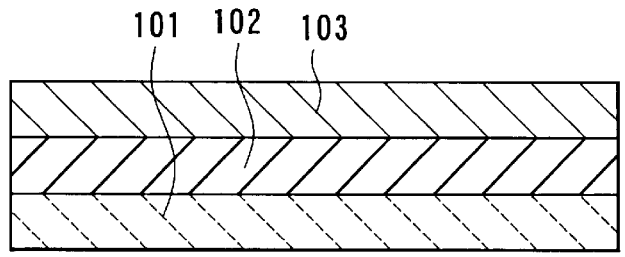
FIG. 24A and FIG. 24B are cross sections for illustrating a step in a method of manufacturing a thin-film magnetic head of related art.
Figure 24B:
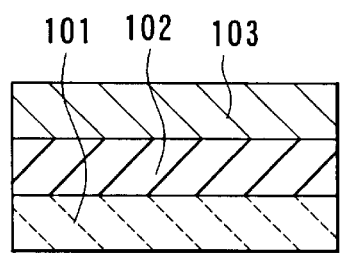
Figure 25A:
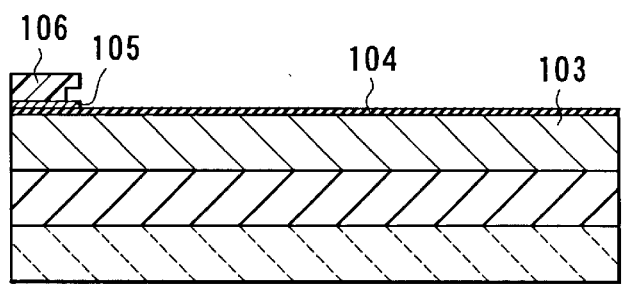
FIG. 25A and FIG. 25B are cross sections for illustrating a step that follows FIG. 24A and FIG. 24B.
Figure 25B:
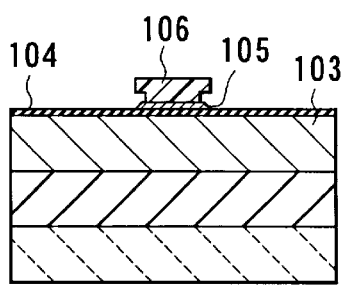
Figure 32:
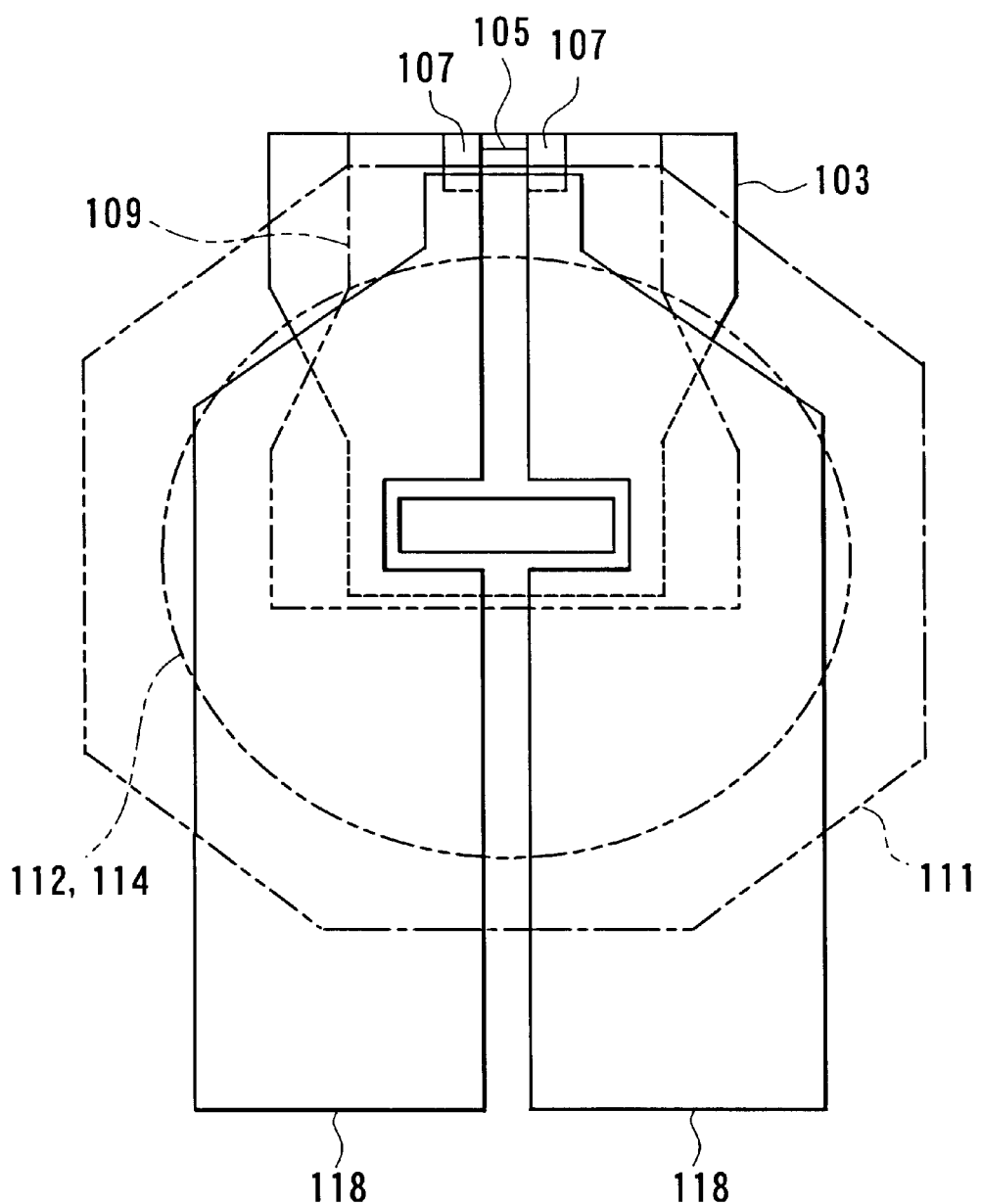
FIG. 32 is a top view of the related-art thin-film magnetic head in the state in one of the manufacturing steps.
Figure 33:
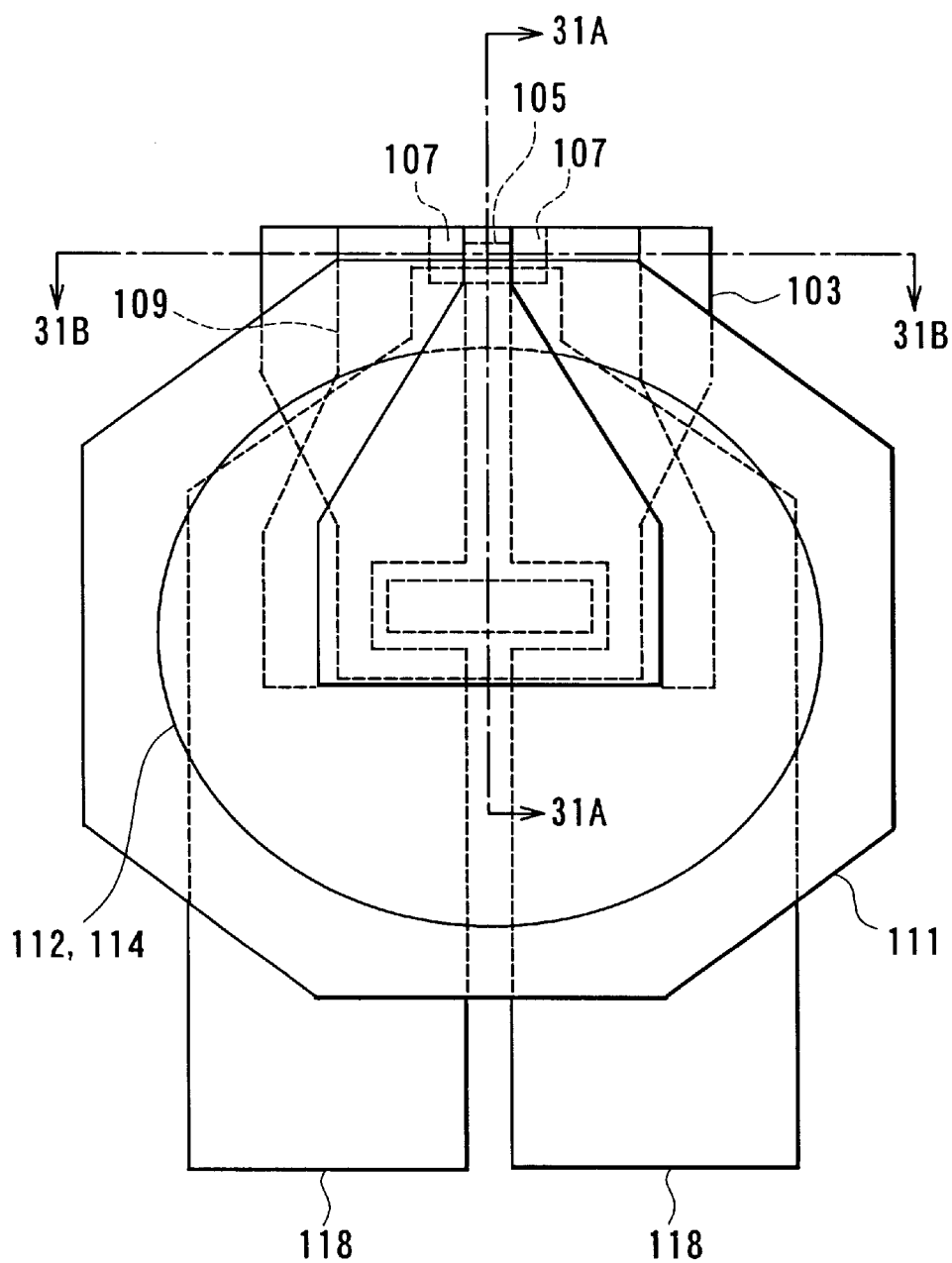
FIG. 33 is a top view of the related-art thin-film magnetic head.

FIG. 21 is a top view of the bottom shield layer 3. FIG. 22 is a top view of FIG. 14A and FIG. 14B. FIG. 23 is a top view of FIG. 19A and FIG. 19B. As shown, the bottom shield layer 3 has the form of a frame having spaces inside in which the conductive layers 7b are placed. The conductive layers 7b are placed in the spaces formed inside the bottom shield layer 3 while the insulating film 2a is placed between the conductive layers 7b and the bottom shield layer 3.

According to the embodiment, since the three layers of coils 33, 36 and 38 are provided, it is possible to obtain the thin-film magnetic head that exhibits an excellent overwrite property in a narrow track and conforms to operation in a high frequency range. In the embodiment, the coil 33 of the first layer is placed in the space between the magnetic layer 10 and the bottom pole tip 9 beneath the recording gap layer 12. Consequently, the height of the apex, that is, the hill-like raised coil portion is reduced although the three layers of coils 33, 36 and 38 are provided. As a result, the top pole tip 13 that defines the recording track width and the top pole layer 19 are reduced in size and the recording track width is thereby reduced.

According to the embodiment, after the coil 33 of the first layer is formed and after the coil 36 of the second layer is formed, the insulating layers 34 and 37 each covering the coils 33 and 36, respectively, are flattened. As a result, the coil 36 of the second layer and the coil 38 of the third layer are reduced in size, and the areas of the coils that occupy the entire thin-film magnetic head are reduced. The magnetic path length is thereby reduced and the performance of the recording head is improved.

The remainder of configuration, functions and effects of the embodiment are similar to those of the first embodiment.

The present invention is not limited to the foregoing embodiments. For example, in the foregoing embodiments, the thin-film magnetic head is disclosed, comprising the MR element for reading formed on the base body and the induction-type magnetic transducer for writing stacked on the MR element. Alternatively, the MR element may be stacked on the magnetic transducer.

That is, the induction-type magnetic transducer for writing may be formed on the base body and the MR element for reading may be stacked on the transducer. Such a structure may be achieved by forming a magnetic film functioning as the top pole layer of the foregoing embodiments as a bottom pole layer on the base body, and forming a magnetic film functioning as the bottom pole layer of the embodiments as a top pole layer facing the bottom pole layer with a recording gap film in between. In this case it is preferred that the top pole layer of the induction-type magnetic transducer functions as the bottom shield layer of the MR element as well.

In the thin-film magnetic head having such a structure, the top shield layer of the MR element corresponds to one of the shield layers of the invention. That is, the conductive layers are placed in the grooves of the top shield layer.

A base body having a concavity is preferred for the thin-film magnetic head having such a structure. If the coils are formed in the concavity of the base body, the thin-film magnetic is further reduced in size.

Alternatively, the insulating layers formed between the thin-film coils forming the coils of the induction-type magnetic transducer may be all made of inorganic layers.

According to the thin-film magnetic head or the method of manufacturing the same of the invention thus described, the two shield layers are placed to face each other with the magnetoresistive element in between. One of the shield layers has the shape of a frame having space in which at least part of the electrode is placed. The at least part of the electrode is placed in the space of the one of the shield layers while the at least part of the electrode is insulated from the one of the shield layers. As a result, a high insulation property is obtained between the electrode and each of the shield layers. Since the electrode is not inserted between the shield layers with an insulating layer in between, an insulation property is improved between each of the shield layers and the electrode connected to the magnetoresistive element without increasing the thickness of the insulating layer between each of the shield layers and the magnetoresistive element. In addition, the wiring resistance of the electrode is more reduced since the electrode is made thick enough. Furthermore, the effect of noises on the electrode is reduced since part of the electrode placed in the space of the one of the shield layers is held in the shield layer and shielded.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head comprising:
   a magnetoresistive element;
   two shield layers, placed to face each other with the magnetoresistive element in between, for shielding the magnetoresistive element;
   insulating layers each of which is provided between the magnetoresistive element and each of the shield layers; and an electrode connected to the magnetoresistive element; wherein:

one of the shield layers has the shape of a frame having a space in which at least part of the electrode is placed, the space penetrating through the one of the shield layers; and the at least part of the electrode is placed in the space and insulated from the one of the shield layers.

2. The thin-film magnetic head according to claim 1, wherein an insulating film is provided between the one of the shield layers and the electrode, and the one of the shield layers is insulated from the electrode by the insulating film.

3. The thin-film magnetic head according to claim 1, further comprising an induction-type magnetic transducer for writing including: two magnetic layers magnetically coupled to each other and including magnetic pole portions opposed to each other, the pole portions being located in regions on a side of a surface facing a recording medium, the magnetic layers each including at least one layer; a gap layer placed between the pole portions of the magnetic layers; and a thin-film coil at least part of which is placed between the magnetic layers, the at least part of the coil being insulated from the magnetic layers.

* * * * *